(12) United States Patent
Yoshida

(10) Patent No.: US 7,152,403 B2
(45) Date of Patent: Dec. 26, 2006

(54) POWER UNIT

(75) Inventor: Yoshihiro Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 11/088,127

(22) Filed: Mar. 22, 2005

(65) Prior Publication Data
US 2005/0204737 A1 Sep. 22, 2005

(30) Foreign Application Priority Data
Mar. 22, 2004 (JP) .............................. 2004-082083

(51) Int. Cl.
*F16D 39/00* (2006.01)
*F16H 39/14* (2006.01)
*F16D 31/02* (2006.01)

(52) U.S. Cl. ..................... 60/487; 60/435; 60/488; 60/494

(58) Field of Classification Search .................. 60/435, 60/436, 487, 488, 489, 494
See application file for complete search history.

(56) References Cited

U.S. PATENT DOCUMENTS

| 3,453,904 A | 7/1969 | Dangautheir | |
| 4,781,022 A * | 11/1988 | Hayashi et al. | 60/489 |
| 5,085,053 A | 2/1992 | Hayashi et al. | 60/488 |
| 5,353,595 A * | 10/1994 | Hayashi et al. | 60/489 |
| 6,588,207 B1 * | 7/2003 | Pouliot | 60/487 |
| 2004/0206079 A1 * | 10/2004 | Ito et al. | 60/487 |

FOREIGN PATENT DOCUMENTS

| CA | 2 439 989 | 3/2005 |
| JP | 1-93661 | 4/1989 |

* cited by examiner

*Primary Examiner*—Thomas E. Lazo
(74) *Attorney, Agent, or Firm*—Hamre, Schumann, Mueller & Larson, PC

(57) ABSTRACT

A power unit includes an engine and a static hydraulic continuously variable transmission with a swash plate type hydraulic pump and a hydraulic motor, which are connected via a hydraulic pressure closing circuit. This power unit drives the hydraulic pump to rotate with the engine and performs swash plate angle control of the hydraulic motor. A crankshaft mechanism of the engine and a rotating mechanism of the static hydraulic continuously variable transmission are housed in a transmission housing. A cylinder of the engine is integrated with the transmission housing, and a swash plate control motor for swash plate angle control of the hydraulic motor is positioned at an area adjacent a root of the cylinder in the transmission housing.

13 Claims, 16 Drawing Sheets

POWER UNIT

TECHNICAL FIELD

Embodiments of the present invention relate to power units for vehicles. More specifically, embodiments of the present invention relate to engines and static hydraulic continuous variable transmissions.

BACKGROUND

Static hydraulic continuously variable transmissions have been used in various applications. As an example, a static hydraulic continuous variable transmission is disclosed in Japanese Patent Publication No. 93661/1989. The continuously variable transmission disclosed therein uses a fixed swash plate type hydraulic pump and a variable swash plate type hydraulic motor to perform continuously variable transmission control by variably controlling a swash plate angle of the motor. A motorcycle including the static hydraulic continuously variable transmission is also disclosed. A shift control apparatus to perform the swash plate angle control of a motor is formed of a motor (swash plate actuator), a reduction gear apparatus, and a ball-nut mechanism (rotation-linear movement converting mechanism), and is positioned to extend to the external side of the rear part of the continuously variable transmission housing.

However, the shift control apparatus described above is provided with the swash plate actuator formed of a motor or the like in the manner being extended to the external side from the rear part of the continuously variable transmission. The swash plate actuator provides a protection cover which covers the swash plate actuator in order to eliminate exposure to splash water from the lower side of the body, rain water, and dust or the like from the front side. However, this shift control apparatus also requires that the size of the extension to the external side to be increased due to the protection cover and, therefore, the cooling property (air-cooling characteristic) of the swash plate actuator is deteriorated.

Particularly, as is disclosed in Japanese Patent Publication No. 93661/1989, in structures where the swash plate actuator is extended toward the rear side and adjacent to a drive chain for transmitting the driving force to the rear wheel while it is mounted to the motorcycle, the actuator is likely to receive the splash water from the lower side of the body when it is running or to allow adhesion of oil splashed from the drive chain. Moreover, a swing arm is also provided for the motorcycle in order to support the rear wheel, but here rises a problem that the shape of swing arm is restricted in order to eliminate interference between the swing arm and the swash plate actuator. It is also thought to provide the swing arm to the rear side of the body in view of avoiding such interference, but in this case, a new problem is created in that the total length of the body becomes longer.

SUMMARY

Aspects of the present invention relate to a new power unit which can protect the swash plate actuator from the external side without use of the protection cover and does not generate a problem of interference for the swing arm when the same power unit is mounted to a motorcycle.

According to one aspect, a power unit includes an engine and a static hydraulic continuously variable transmission having a swash type hydraulic pump and a hydraulic pump coupled via a hydraulic pressure closing circuit in order to extract an output rotation of the hydraulic motor by changing the speed of input rotation of the hydraulic pump through the rotating drive of the hydraulic pump with the engine and the swash plate angle control of at least one of the hydraulic pump and hydraulic motor. Moreover, a crank shaft mechanical unit of the engine and a rotary mechanical unit of the static hydraulic continuously variable transmission are housed within a main housing, a cylinder casing for accommodating a piston mechanical unit of the engine is integrally coupled with the main housing, and a swash plate actuator for conducting swash plate angle control of at least one of the hydraulic pump and the hydraulic motor is arranged at the area adjacent the root of the cylinder casing in the main housing.

According to another aspect, when the power unit is mounted to a motorcycle, a rotating shaft of the static hydraulic continuously variable transmission is extended in right and left directions of a body of the motorcycle, the cylinder casing is mounted extending upward from the main housing, and the swash plate actuator is mounted at a rear side of the cylinder casing and located at an upper side of the main housing. In this case, it is preferable that the swash plate actuator is positioned with a bias in any of the right and left directions of the body for the center of the cylinder casing.

DETAILED DESCRIPTION

Example embodiments made in accordance with the present invention will be described with reference to the accompanying drawings.

Figure 2:
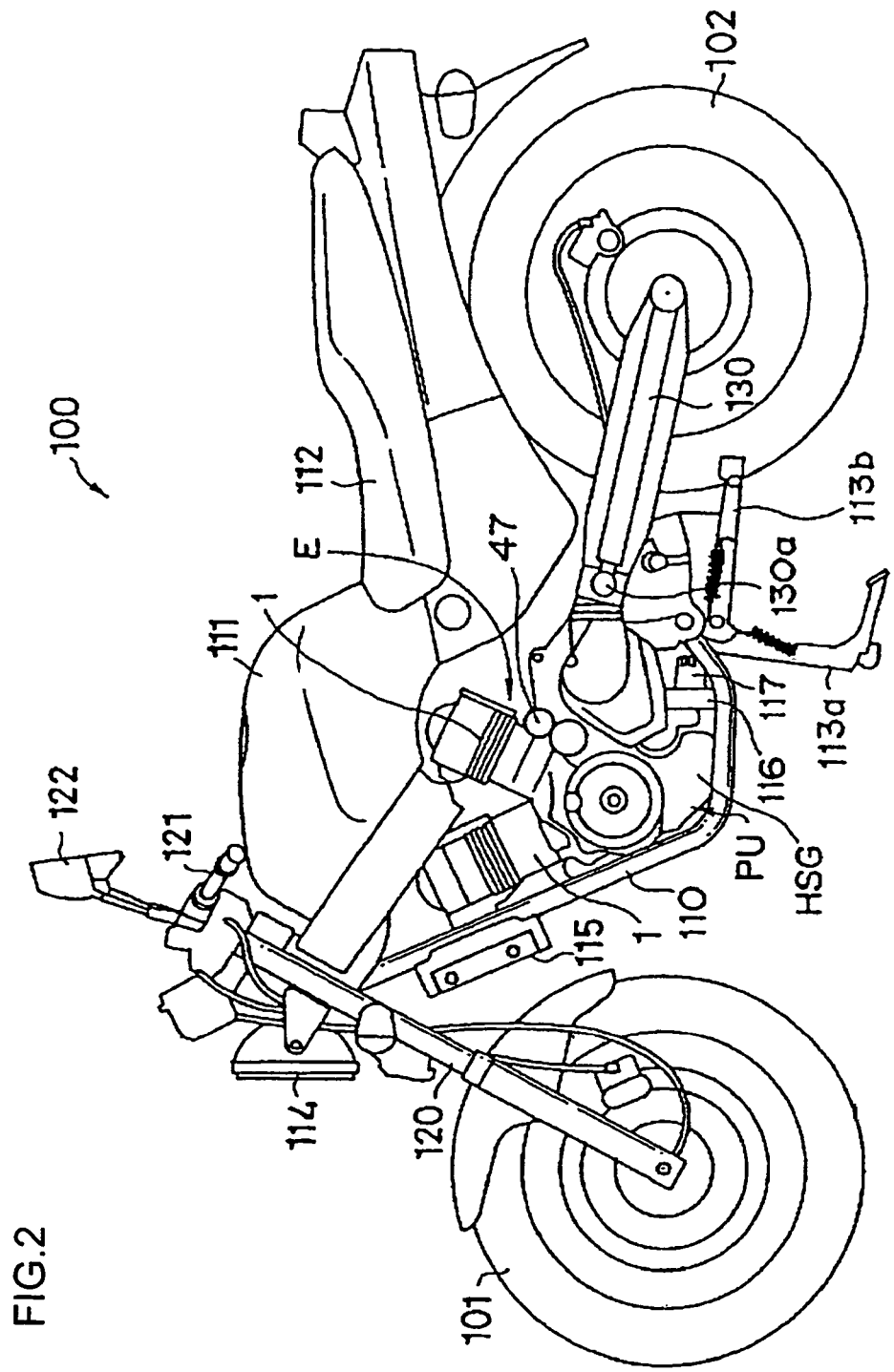
FIG. 2 is an external view of a motorcycle including the static hydraulic continuously variable transmission of FIG. 1.

FIG. 2 illustrates the total external appearance of a motorcycle including an example embodiment of a power unit made in accordance with the present invention. In FIG. 2, an internal structure is exposed by removing a part of a side surface covering member of the motorcycle. This motorcycle 100 comprises a main frame 110, a front fork 120 fitted to freely rotate around a shaft obliquely extending upper and lower directions at the front end part of the main frame 110, a front wheel 101 fitted to freely rotate at the lower end of the front fork 120, a swing arm 130 fitted pivotally to freely swing around a coupling axle 130a horizontally extending to the rear part of the main frame 110, and a rear wheel 102 fitted to freely rotate to the rear end of the swing arm 130.

The main frame 110 is provided with a seat 112 for a rider, a main-stand 113a and a sub-stand 113b for holding the body in the standing condition when the motorcycle is not running, a head light 114 for lighting the front direction when the motorcycle is running in the night, a radiator 115 for cooling the engine coolant, and a power unit PU for generating a rotating drive force to drive the rear wheel 102 or the like. The front fork 120 is provided with a handlebar (steering handlebar) 121 for the steering operation with a rider, and a rear viewer 122 for obtaining near view or the like. Within the swing arm 130, a drive shaft is provided, as will be described later, to transmit the rotating drive force generated by the power unit PU to the rear wheel.

In the example motorcycle 100 described above, a static hydraulic continuously variable transmission CVT is used into the power unit PU. This power unit PU will be described below.

Figure 3:
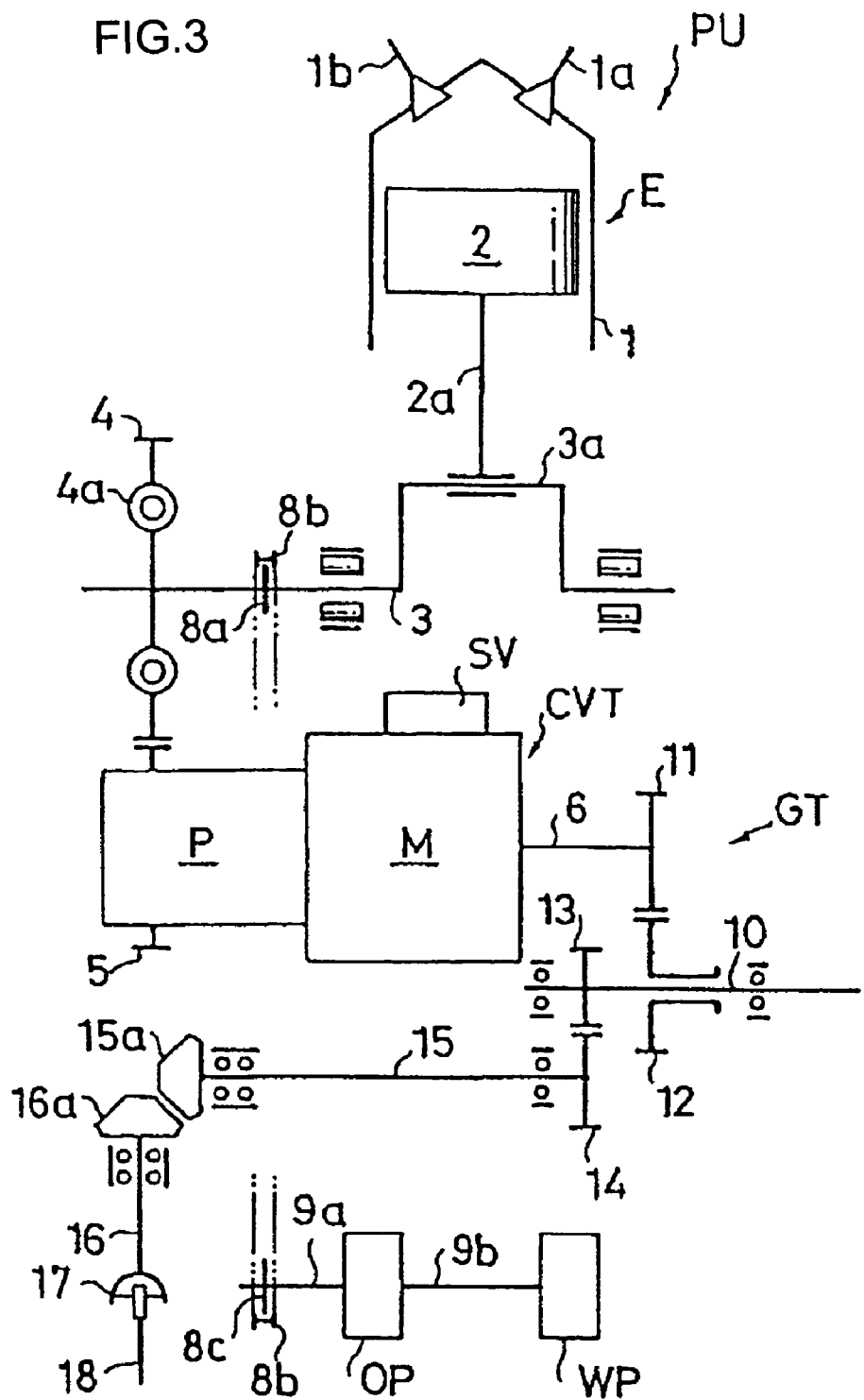
FIG. 3 is a schematic diagram illustrating a power transmission path structure of the power unit of FIG. 1.
Figure 4:
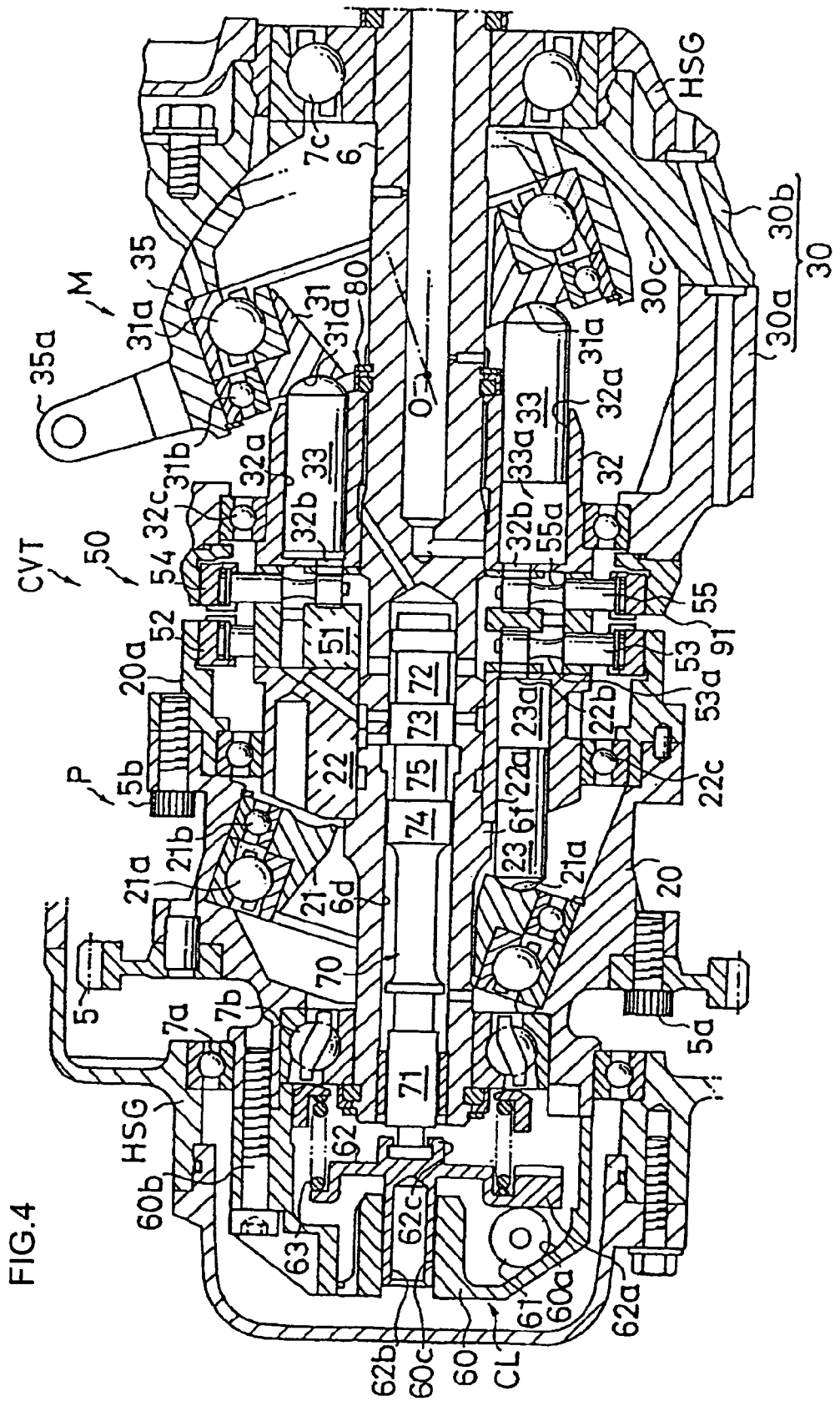
FIG. 4 is across-sectional view illustrating a structure of the static hydraulic continuously variable transmission of FIG. 1.

FIG. 3 is a schematic view of structure of the power unit PU, comprising an engine E to generate a rotating drive force, a static hydraulic continuously variable transmission CVT for continuously shifting the speed of the output rotation of the engine E, and a transmission gear train GT for direction switching and transmission of the output rotation of the static hydraulic continuously variable transmission CVT.

As illustrated in FIG. 2, the engine E is formed of a V-type cylinder engine including a V-bank and a cylinder 1 is allocated to obliquely extend in the form of character V in the upper direction of the front and rear sides. This engine E includes a piston 2 positioned in a cylinder 1 having intake/exhaust valves 1a, 1b to a head portion. In the engine E, an intake valve 1a and an exhaust valve 1b are opened and closed in the predetermined timing, the piston 2 is caused to make the reciprocal motion with combustion of the fuel-mixing air within the cylinder, and the reciprocal motion of the piston 2 is transmitted to a crank portion 3a via a coupling rod 2a for rotating drive of a crank shaft 3. At the end part of the crank shaft 3, an input drive gear 4 having a damper 4a is mounted to transmit the rotating drive force of the crank shaft 3 to the input drive gear 4.

The crankshaft 3 is provided with a drive sprocket 8a to transmit the rotating drive force to a driven sprocket 8c mounted to pump drive shafts 9a, 9b via a chain 8b. The pump drive shafts 9a, 9b are allocated with an oil pump OP and a water pump WP as illustrated in the figure and are driven with the engine E. The working fluid discharged from the oil pump OP is supplied as the auxiliary oil and lubricant oil of the static hydraulic continuously variable transmission CVT as described above. However, this working fluid is cooled, as illustrated in FIG. 2, with an oil cooler 116 allocated at the rear lower part of the power unit PU and is then filtered with an oil filter 117. Moreover, the coolant discharged from the water pump WP is used for cooling the engine E but the coolant heated up to a higher temperature with the engine E is then cooled with a radiator 115.

The static hydraulic continuously variable transmission CVT includes a swash plate plunger type hydraulic pump P and a swash plate plunger type hydraulic motor M. An input driven gear 5 coupled with a pump casing forming the swash plate plunger type hydraulic pump P is engaged with the input drive gear 4 and the rotating drive force of the ending E is transmitted to the input driven gear 5 to rotatably drive the pump casing. The hydraulic pump P is of the fixed capacity type pump ensuring constant swash plate angle, while the hydraulic motor M is of the variable capacity type motor ensuring variable swash plate angle and is provided with a motor servo-mechanism SV for variably adjusting the motor swashplate angle. An output rotation varied in speed continuously with this static hydraulic continuously variable transmission CVT is outputted to a transmission output shaft 6. Additional details of the static hydraulic continuously variable transmission CVT are provided below.

The transmission output shaft 6 is connected with the transmission gear train GT and rotation of the transmission output shaft 6 is shifted, with the transmission gear train GT, for forward motion-neutral switching and deceleration or the like. The transmission gear train GT includes a counter shaft 10 and a first output drive shaft 15 extending in parallel with the transmission output shaft 6, moreover, a first gear 11 allocated in coupling with the transmission output shaft 6, a second gear 12 allocated to freely move in the axial direction of the counter shaft 10 and to integrally rotate with the counter shaft 11, a third gear 13 allocated to couple with the counter shaft 10, and a fourth gear 14 allocated to always engage with the third gear 13 and to couple with the first output drive shaft 15. The second gear 12 is moved in the axial direction over the counter shaft 10 in accordance with the changing operation with a rider and is then engaged with the first gear 11 to set the forward motion and is then disengaged from the first gear 11 to set the neutral state.

The end part of a first output drive shaft 15 is provided with an output drive bevel gear 15*a* and the rotating drive force is transmitted to a second output drive shaft 16 from an output driven bevel gear 16*a* engaged with the output drive bevel gear 15*a*. The second output drive shaft 16 is coupled with a drive shaft 18 via a universal joint 17. This second output drive shaft 16 is then coupled, as described above, with the rear wheel 102 through the inside of the swing arm 130. Accordingly, the rotating drive force is transmitted to the rear wheel 102 for rotation thereof. The universal joint 18 is located coaxially with the coupling axle 130*a* for the main frame 110 of the swing arm 130.

Next, the static hydraulic continuously variable transmission CVT is described with reference to FIG. 1 and FIGS. 4–6. The static hydraulic continuously variable transmission CVT is formed with the swash plate plunger type hydraulic pump P and the swash plate plunger type hydraulic motor M. The transmission output shift 6 is allocated extending through the center of the CVT. The transmission output shaft 6 is supported to freely rotate with ball bearings 7*a*, 7*b*, 7*c* for a transmission housing HSG.

The hydraulic pump P includes a pump casing 20 which is allocated coaxially over the transmission output shaft 6 to freely rotate relatively, a pump swashplate member 21 allocated in the pump casing 20, keeping inclination of the predetermined angle to the rotating center axis of the pump casing 20, a pump cylinder 22 allocated opposing to the pump swash plate member 21, and a plurality of pump plungers 23 which are allocated to freely slide within a plurality of pump plungers 22*a* formed extending in the axial direction in the annular layout surrounding the center axis of the pump cylinder 22. The pump casing 20 is supported to freely rotate with the bearings 7*b*, and 22*c* over the transmission output shaft 6 and pump cylinder 22 and is also supported to freely rotate with a bearing 7*a* for the transmission housing HSG. The pump swash plate member 21 is allocated to freely rotate around the shaft inclined for the predetermined angle with the bearings 21*a*, 21*b* for the pump casing 20. Namely, the pump cylinder 22 is supported coaxially to freely rotate with the bearing 22*c* for the pump casing 20.

At the external circumference of the pump casing 20, an input driven gear 5 is fitted through tightening of a bolt 5*a*. Moreover, an external end portion of the pump plunger 23 is extended toward the external side and is in contact and engaged with a swash plate surface 21*a* of the pump swash plate member 21 and the internal end portion located within the pump plunger hole 22*a* is forming a pump oil chamber 23*a* within the pump plunger hole 22*a* opposing to a bubble body 51 of a distribution valve 50 described later. At the end portion of the pump plunger hole 22*a*, a pump aperture 22*b* is formed to work as a pump discharge port and an intake port. As described above, when the input driven gear 5 is driven to rotate, the pump casing 20 is also driven to rotate, the pump swashplate member 21 allocated within the pump casing is driven to swing with rotation of the pump casing 20, the pump plunger 23 executes the reciprocal movement within the pump plunger hole 22*a* in accordance with the swinging movement of the swash plate surface 21*a*, and the working fluid at the internal side of the pump oil chamber 23*a* is discharged and charged.

At the right end portion of the pump casing 20, a pump offset member 20*a* is mounted through coupling with a bolt 5*b*. The internal circumferential surface 20*b* of this pump offset member 20*a* is formed in the shape of cylinder offset for the rotating shaft of the pump casing 20. Since the pump offset member 20*a* including the deflected internal circumferential surface 20*b* as described above is formed separately from the pump casing 20, it can be manufactured easily.

The hydraulic motor M includes a motor casing 30 (including a plurality of casings 30*a*, 30*b*) which is fixed and held through coupling with the transmission housing HSG, a motor swing member 35 which is supported to slide with a supporting spherical surface 30*c* formed at the internal surface of the motor casing (casing 30*b*) and is also supported to freely swing around the swing center O extending in the right angle (perpendicular direction to the paper surface) for the center axis of the transmission output shaft 6, a motor swash plate member 31 supported and allocated to freely rotate with bearings 31*a*, 31*b* within the motor swing member 35, a motor cylinder 32 provided opposing to the motor swash plate member 31, and a plurality of motor plunger 33 allocated to freely slide within a plurality of motor plunger holes 32*s* formed, through the motor cylinder 32, in the axial direction with the annular layout surrounding the center axis of the motor cylinder 32. The motor cylinder 32 is supported to freely rotate with the motor casing 30 via the bearing 32*c* at the external circumferential portion thereof.

Figure 15:
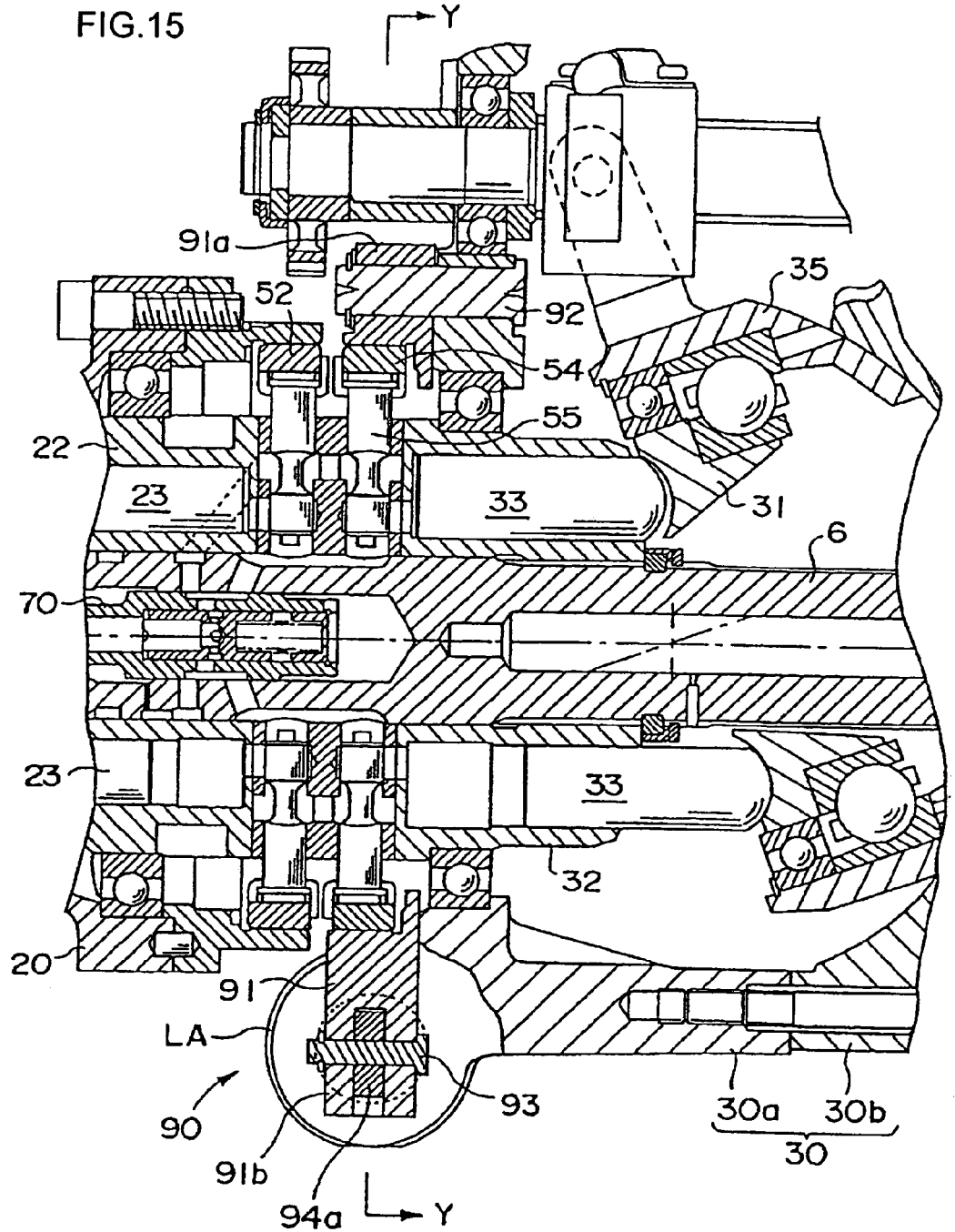
FIG. 15 is a cross-sectional view illustrating a structure of a lockup mechanism in the static hydraulic continuously variable transmission of FIG. 1.

In the hydraulic motor M, a lockup mechanism 90 (refer to FIG. 15 to FIG. 17) is provided at the left end portion of the motor casing 30 and a motor offset member 91 forming this lockup mechanism 90 is provided in slideable contact with the end face of the motor casing 30*b*. This lockup mechanism 90 will be described further below. A cylindrical internal circumference surface 91*a* formed at the motor offset member 91 is provided to movably swing between the lockup position located coaxially with the motor cylinder 32 and the normal position located at the offset location for the rotating shaft of the motor cylinder 32.

The external end portion of motor plunger 33 is extended to the external side to engage with the swash plate surface 31*a* of the motor swash plate member 31, while the internal end portion located within the plunger hole 32*a* is provided in opposition to the valve body 51 to form the motor oil chamber 33*a* within the motor plunger hole 32*a*. At the end portion of the motor plunger hole 32*a*, a motor aperture 32*b* is formed to work the motor discharge port and intake port. An arm 35*a* in which the end portion of the motor swing member 35 is formed extruding to the external diameter side is also protruded to the external side of the diameter direction and is coupled with a motor servo mechanism SV. The motor servo mechanism SV controls the arm 35*a* to move to the right and left in FIG. 1. The motor swing member 35 is also controlled to swing around the swing center O. When the motor swing member 35 is swung, the motor swashplate member 31 supported to freely rotate within the motor swing member 35 is also swung, changing the swash plate angle thereof.

Figure 5:
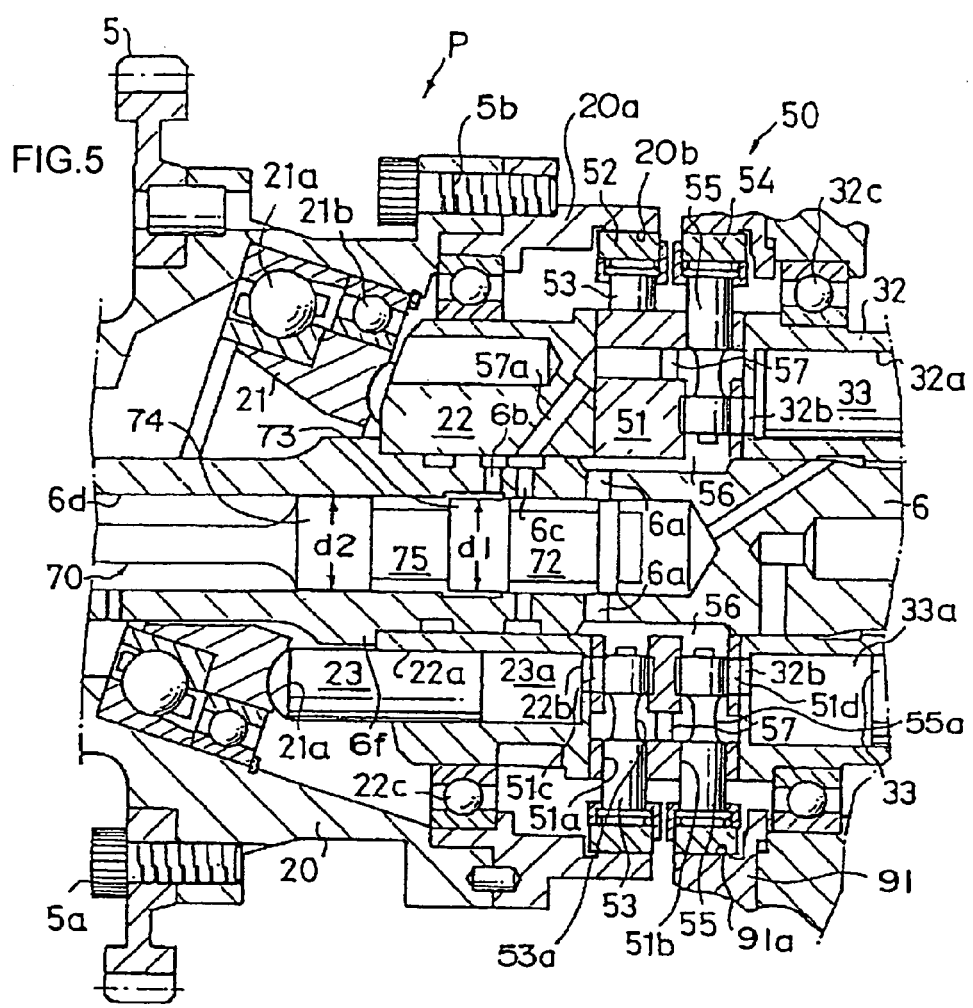
FIG. 5 is across-sectional view illustrating an enlarged structure of apart of the static hydraulic continuously variable transmission of FIG. 1.
Figure 6:
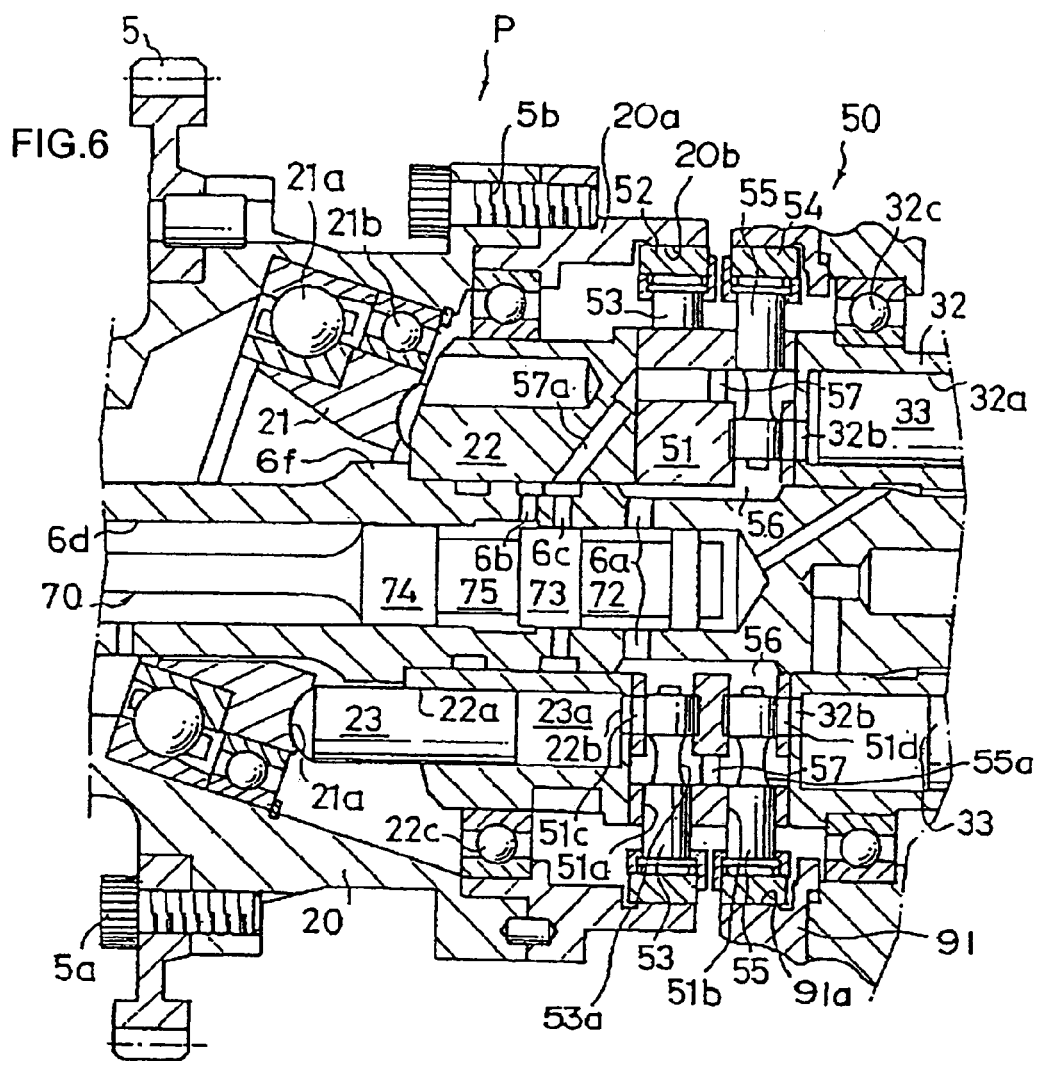
FIG. 6 is across-sectional view illustrating the enlarge structure of the part of the static hydraulic continuously variable transmission of FIG. 1.

A distribution valve 50 is arranged between the pump cylinder 22 and motor cylinder 32. FIG. 5 and FIG. 6 illustrate the enlarged distribution valve 50. A valve body 51 of the distribution valve 50 is held and integrated by the brazing between the pump cylinder 22 and motor cylinder 32, and the motor cylinder 32 is also coupled via a spline to the transmission output shaft 6. Therefore, the pump cylinder 22, distribution valve 50, motor cylinder 32, and the transmission output shaft 6 are integrally rotated.

The integrated pump cylinder 22, distribution valve 50, and motor cylinder 32 are referred to as an output rotating body, and the structure mounting this output rotating body by positioning to the predetermined location in the axial direction of the transmission output shaft 6 is described below. For this positioning, a restricting portion 6f is formed toward the external circumference side to the transmission output shaft 6, and the left side end surface of the pump cylinder 22 is in contact with the restricting portion 6f for the left side positioning. The right side positioning of the output rotating body is formed with an engaging member 80 mounted to the transmission output shaft 6 opposing the right side end surface of the motor cylinder 32.

Figure 7A:
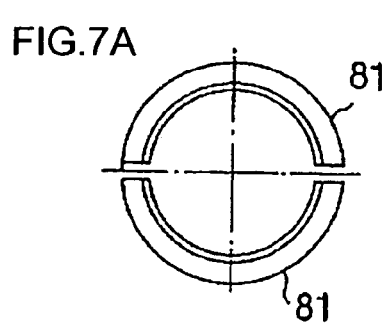
FIG. 7A is a front elevation of a cotter portion used for positioning of a rotating body in the static hydraulic continuously variable transmission of FIG. 1.
Figure 7B:
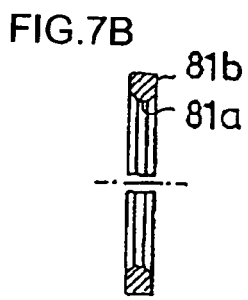
FIG. 7B is a cross-sectional view of the cotter portion of FIG. 7A.
Figure 8A:
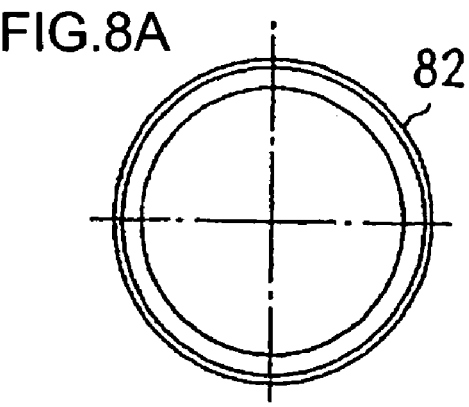
FIG. 8A is a front elevation of a retainer ring used for positioning of the rotating body in the static hydraulic continuously variable transmission of FIG. 1.
Figure 8B:
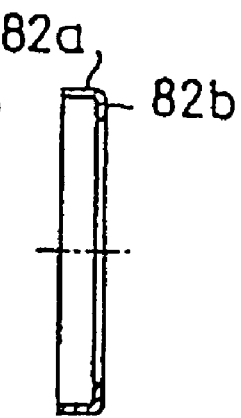
FIG. 8B is a cross-sectional view of the retainer ring of FIG. 8A.
Figure 9A:
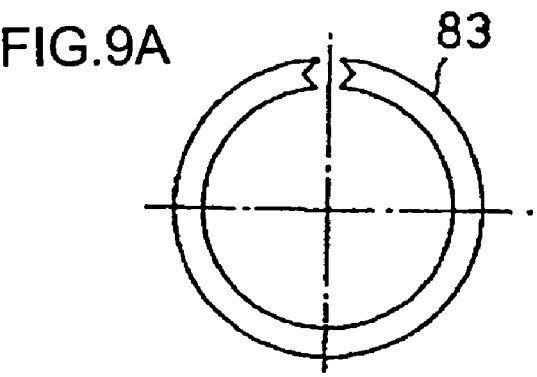
FIG. 9A is a front elevation of a circlip used for positioning of the rotating body in the static hydraulic continuously variable transmission of FIG. 1.
Figure 9B:
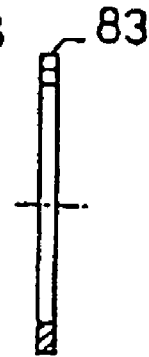
FIG. 9B is across-sectional view of the circlip of FIG. 9A.
Figure 12:
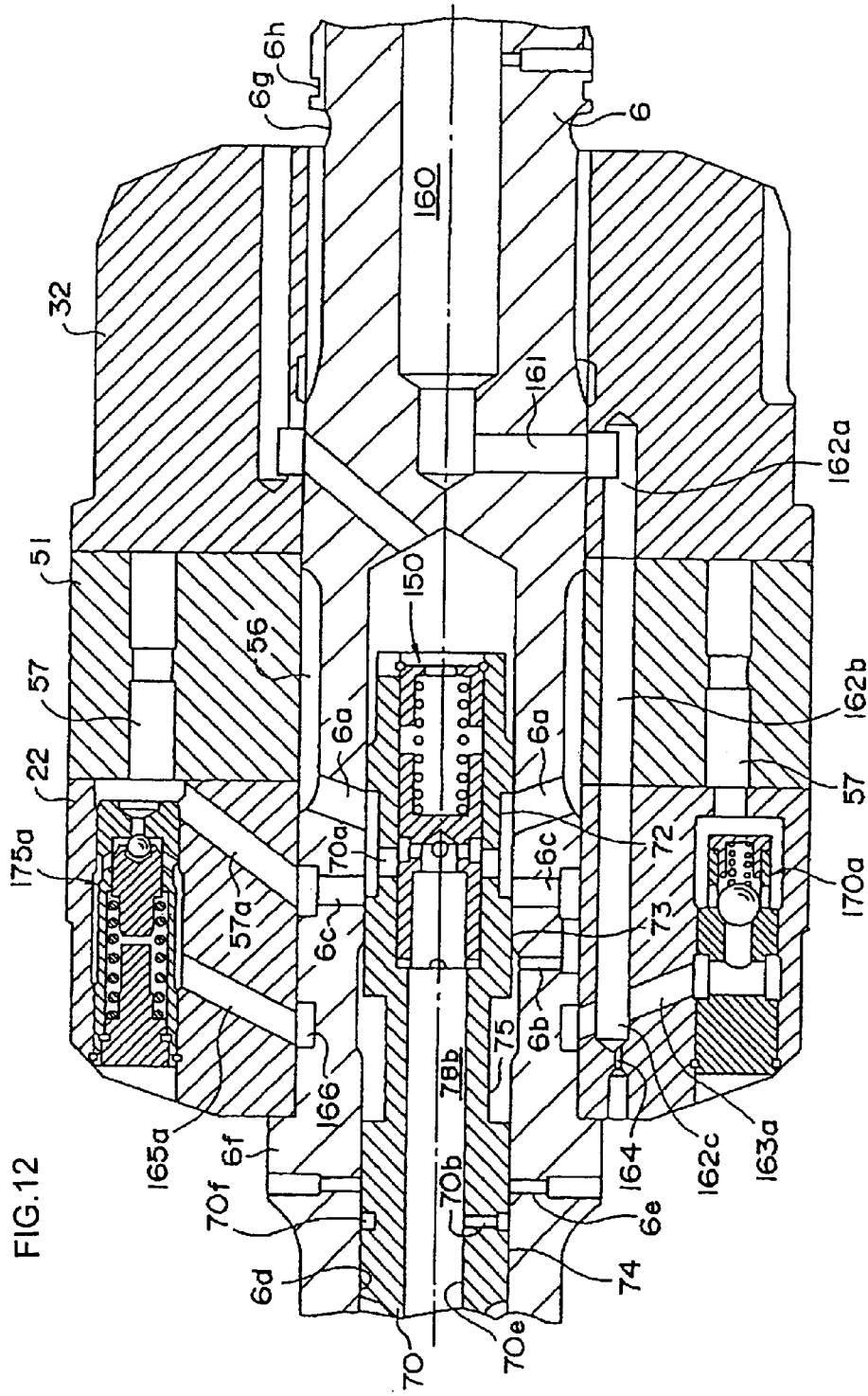
FIG. 12 is a cross-sectional view illustrating structures of a transmission output shaft and an output rotating body in the static hydraulic continuously variable transmission of FIG. 1.
Figure 13:
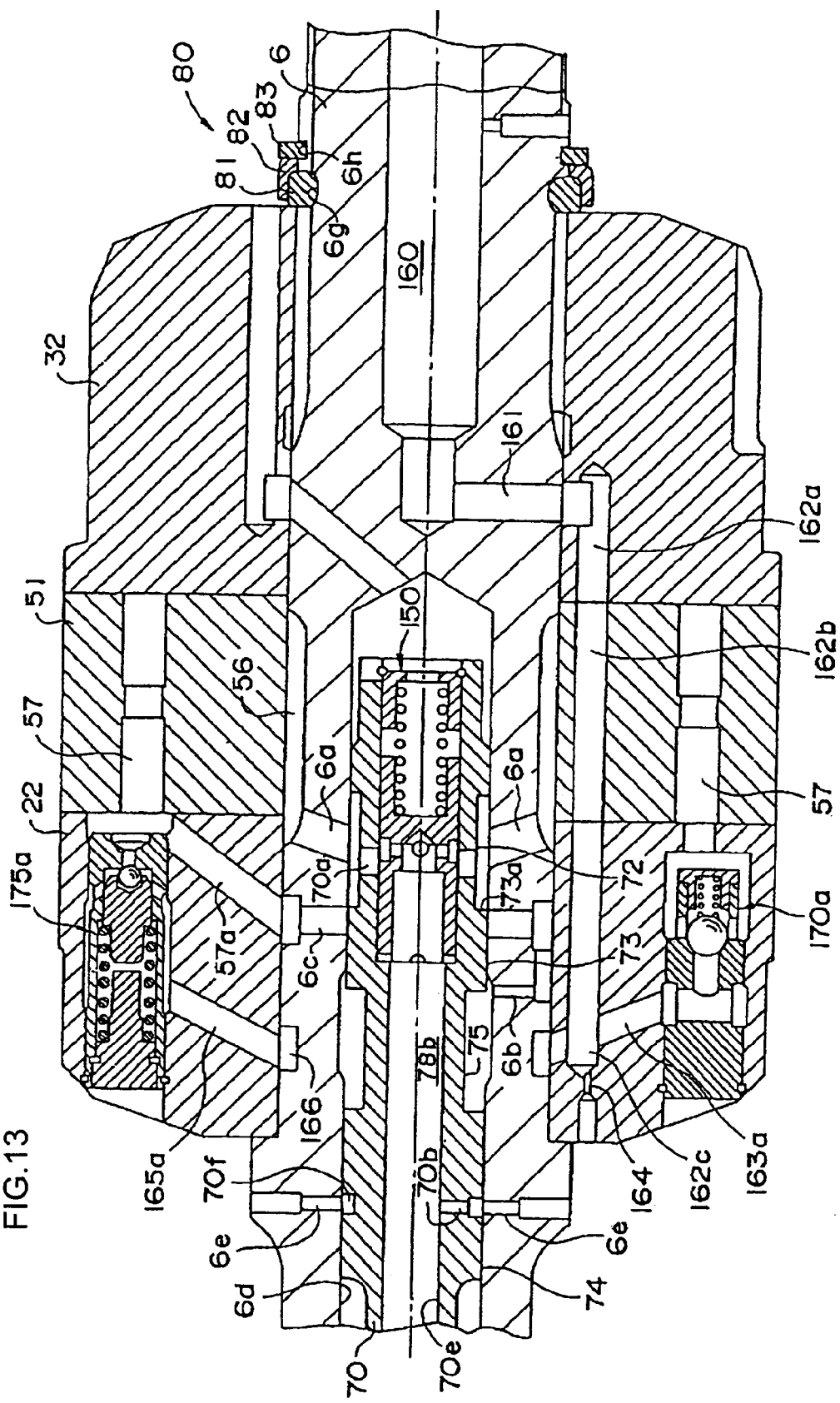
FIG. 13 is a cross-sectional view illustrating structures of the transmission output shaft and output rotating body in the static hydraulic continuously variable transmission of FIG. 1.
Figure 14:
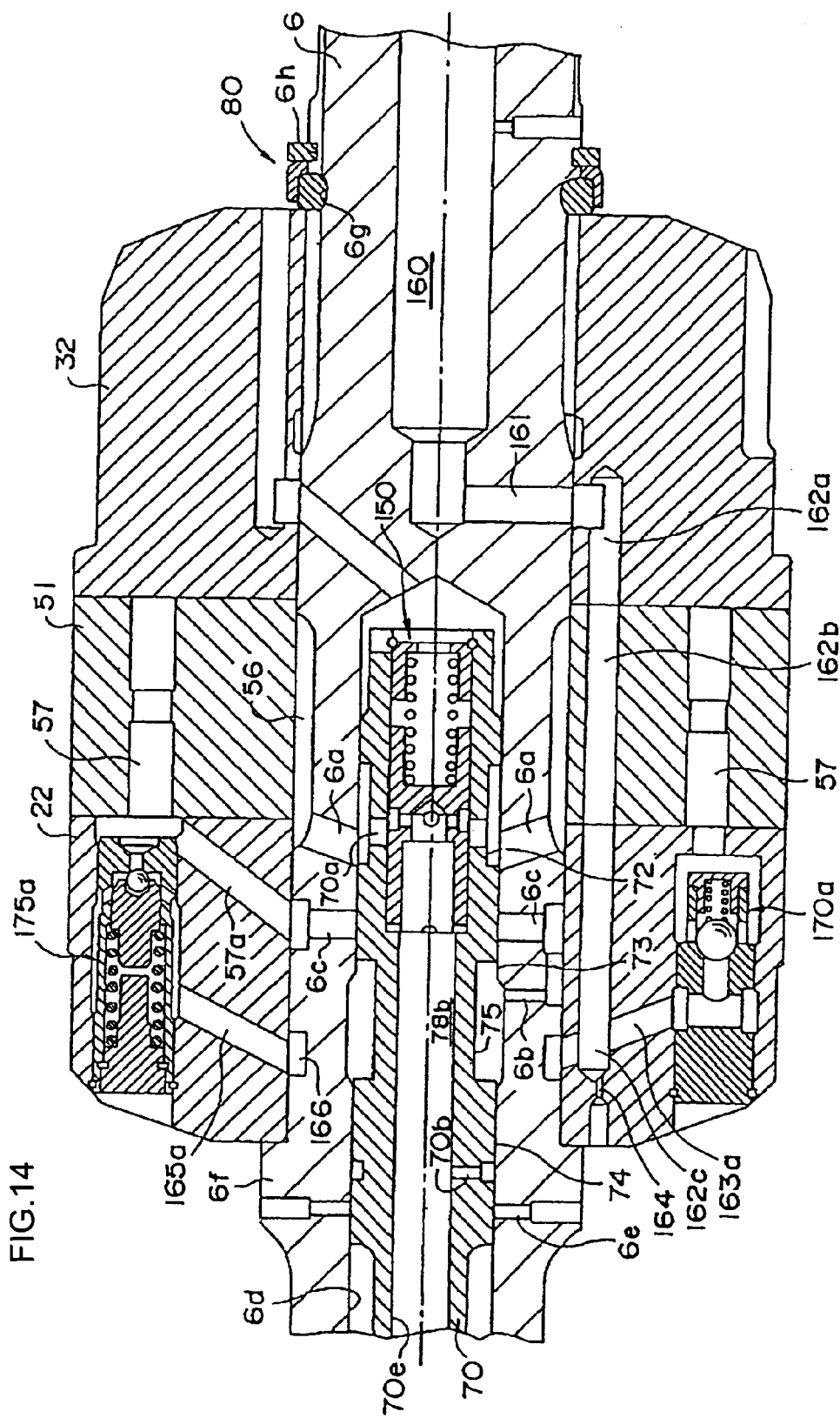
FIG. 14 is a cross-sectional view illustrating structures of the transmission output shaft and output rotating body in the static hydraulic continuously variable transmission of FIG. 1.

As is illustrated in detail in FIGS. 12–14, a first annular engaging groove 6g and a second annular engaging groove 6h are formed on the transmission output shaft 6 for mounting the engaging member 80. To the first engaging groove 6g, a pair of cotter members 81, which are respectively divided into semi-circular portions as illustrated in FIGS. 7A and 7B, are mounted with the internal circumference portion 81a thereof inserting into the first engaging portion 6g. On cotter members 81, a retainer ring 82 illustrated in FIGS. 8A and 8B is mounted in the manner that the side plate portion 82b of the retainer ring 82 is in contact with the side surface of the cotter member 81 and the external circumference portion 82a covers the external circumference surface 81b of the cotter member 81 to hold the cotter member 81 as it is. Moreover, a circlip 83 illustrated in FIGS. 9A and 9B is mounted to the second engaging groove 6h to hold the retainer ring 82 as it is. As a result, the right side end surface of motor cylinder 32 is in contact with the engaging member 80 for the right side positioning. The output rotating body is held by the restricting portion 6f and the engaging member 80, and is then mounted through the positioning on the transmission output shaft 6.

Next, the distribution valve 50 will be described. Particularly as illustrated in FIG. 5 and FIG. 6, a plurality of pump side spool holes 51a and a plurality of motor side spool holes 51b, which are all formed extending in the diameter direction with the equal interval in the circumference direction, are provided in two lines within a valve body 51 forming the distribution valve 50. Within the pump side spool holes 51a, the pump side spools 53 are provided to freely slide, while within the motor side spool holes 51b, the motor side spools 55 are also provided to freely slide.

The pump side spool holes 51a are formed corresponding to the pump plunger holes 22a and a plurality of pump side communicating paths 51c are formed to the valve body 51 for communication between the corresponding pump aperture 22b (pump oil chamber 23a) and the pump side spool hole 51a. The motor side spool hole 51b is formed corresponding to the motor plunger hole 32a and a plurality of motor side communicating paths 51d are formed to the valve body 51 for communicating between the motor aperture 32b (motor oil chamber 33a) and the motor side spool hole 51b.

Moreover, in the distribution valve 50, a pump side cam ring 52 is allocated at the position surrounding the external circumference end portion of the pump side spool 53, while a motor side cam ring 54 at the position surrounding the external circumference end portion of the motor side spool 55. The pump side cam ring 52 is mounted within the internal circumference surface 20b formed, with offset from the rotation center axis of the pump casing 20, at the internal surface of the pump offset member 20a coupled with a bolt 5b to the end portion of the pump casing 20 and is supported to freely rotate by the pump casing 20. The motor side cam ring 54 is mounted within the internal circumference surface 91a of the motor offset member 91 located sliding on the end portion of the motor casing 30. Here, the external circumference end of the pump side spool 53 is engaged to freely and relatively rotate with the internal circumference surface of the pump side cam ring 52, while the external circumference end of the motor side spool 55 is engaged to freely and relatively rotate with the internal circumference surface of the motor side cam ring 54.

An internal path 56 is formed between the internal circumference surface of the valve body 51 and the external circumference surface of the transmission output shaft 6 and the internal circumference end portion of the pump side spool hole 51a, and motor side spool hole 51b communicates with the internal side path 56. Moreover, an external path 57 communicating between the pump side spool hole 51a and the motor side spool hole 51b is formed within the valve body 51.

Operations of the distribution valve 50 of the structure described above will be described below. When the drive force of the engine E is transmitted to the input driven gear 5 to drive the pump casing 20 to rotate, the pump swash plate member 21 swings in accordance with this rotation. Therefore, the pump plunger 23 which is in contact and engaged with the swash plate surface 21a of the pump swash plate member 21 is caused to move reciprocally in the axial direction within the pump plunger hole 22a with the swing of the pump swash plate member 21, the working fluid is discharged passing the pump aperture 22b from the pump oil chamber 23a in accordance with movement of the pump plunger 23 into the internal side, and the working fluid is also charged into the pump chamber 23a passing the pump aperture 22b in accordance with the movement to the external side.

The pump side cam ring 52 mounted to the internal circumference surface 20b of the pump offset member 20a coupled to the end portion of the pump casing 20 is rotated together with the pump casing 20. However, since the pump side cam ring 52 is mounted with an offset to the rotation center of the pump casing 20, the pump side spool 53 is caused to perform reciprocal movement in the diameter direction within the pump side spool hole 51a in accordance with rotation of the pump side cam ring 52. When the pump side spool 53 is caused to execute the reciprocal movement and the pump side spool 53 is moved toward the internal diameter side from the condition illustrated in FIG. 5 and FIG. 6 as described above, the pump side communicating path 51c is coupled to the external side path 57 via the spool groove 53a, and when the pump side spool 53 is moved to the external diameter side from the condition illustrated in FIG. 5 and FIG. 6, the pump side path 51c is coupled with the internal side path 56.

Here, the pump side cam ring 52 controls the pump side spool 53 to conduct the reciprocal movement in the diameter direction in accordance with the reciprocal movement between the position where the pump plunger 23 is pushed to the most external side (called the bottom dead center) and the position where the pump plunger 23 is pushed to the most internal side (called the top dead center) of the swash plate member 21 which is swung with rotation of the pump casing 20. As a result, when the pump plunger 23 is moved to the top dead center from the bottom dead center with rotation of the pump casing 20 and the working fluid in the pump oil chamber 23a is discharged from the pump aperture 22b, this working fluid is transmitted to the external path 57 passing the pump side communicating path 51c. On the other hand, when the pump plunger 23 moves to the bottom dead center from the top dead center with rotation of the pump casing 20, the working fluid in the internal path 56 is charged into the pump oil chamber 23a passing the pump side communicating path 51c and the pump aperture 22b. When the pump casing 20 is driven to rotate, the working fluid discharged from the hydraulic pump P is supplied to the external path 57 and the working fluid is charged to the hydraulic pump P from the internal path 56.

Meanwhile, since the motor side cam ring 54 mounted to the internal circumference surface 91a of the motor offset member 91 located to slide in contact with the end portion of the motor casing 30 is located, when the motor offset member 91 is located at the normal position, with a certain offset for the rotation center of the motor cylinder 32 (output rotating body and transmission output shaft 6), and when the motor cylinder 32 rotates, the motor side spool 55 is reciprocally operated in the diameter direction within the motor side spool hole 51b in accordance with the rotation of the motor cylinder 32. When the motor side spool 55 is operated for reciprocal movement and the motor side spool 55 is moved to the internal diameter side from the condition illustrated in FIG. 5 and FIG. 6, the motor side communicating path 51d is coupled with the external path 57 via the spool groove 55a. Moreover, when the motor side spool 55 is moved toward the external diameter side from the condition illustrated in FIG. 5 and FIG. 6, the motor side path 51d is communicated with the internal path 56. Operations when the motor offset member 91 is set to the lockup position and the ordinary position will be described below.

Figure 1:
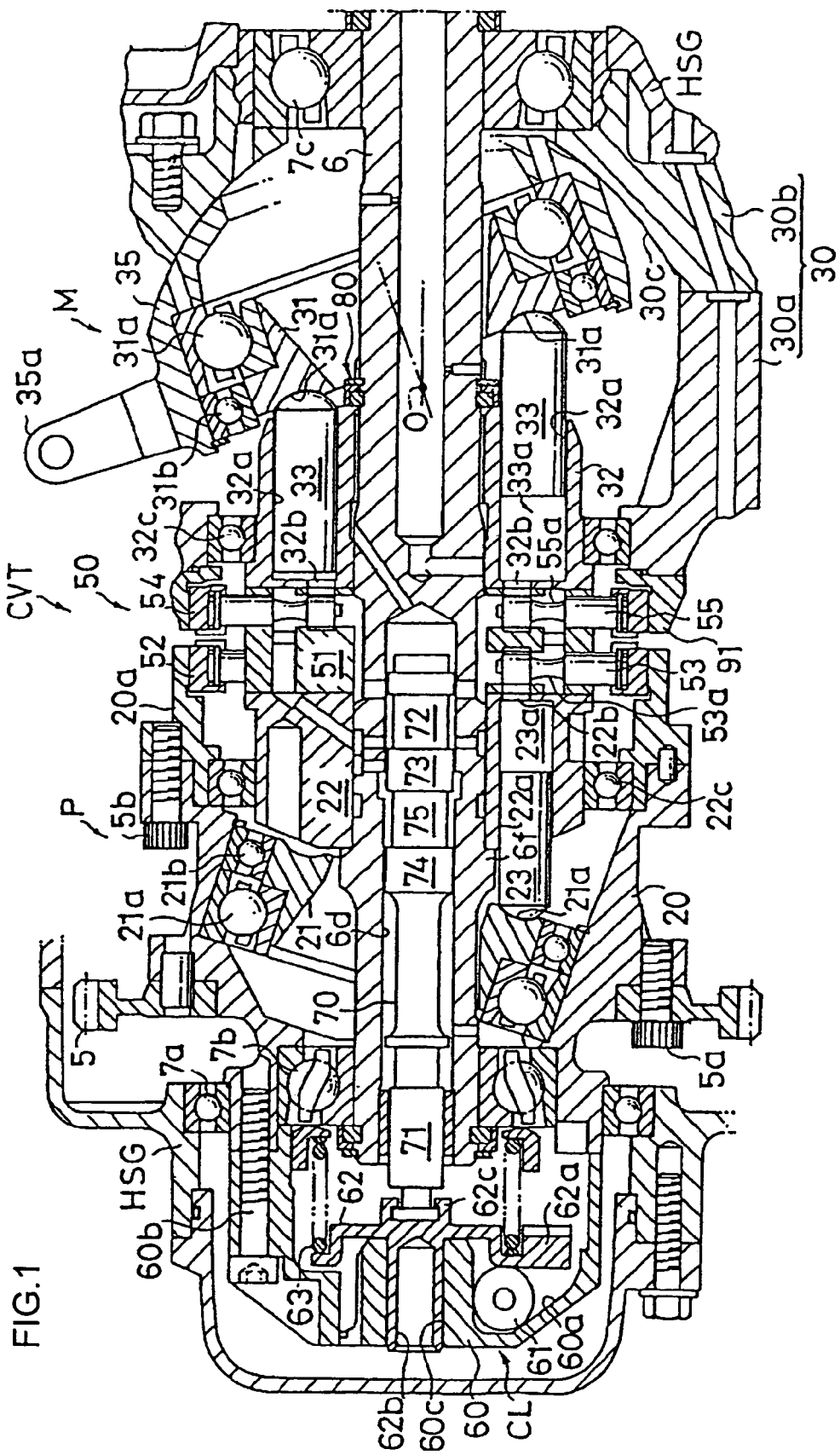
FIG. 1 is a cross-sectional view illustrating a structure of a static hydraulic continuously variable transmission forming a power unit in accordance with an embodiment of the present invention.

Here, as described above, the working fluid discharged from the hydraulic pump P is sent to the external path 57 and this working fluid is supplied into the motor oil chamber 33a passing the motor aperture 32b from the motor side communicating path 51d to press the motor plunger 33 to the external side in the axial direction. As described above, the external side end portion of the motor plunger 33 receiving the pressing force to the external side in the axial direction is in contact and slide over the portion reaching the bottom dead center from the top dead center of the motor swash plate member 31 under the condition that the motor swing member 35 swings as illustrated in FIG. 1. Accordingly, the motor cylinder 32 is driven to rotate to move the motor plunger 33 to move up to the bottom dead center from the upper point along the motor swash plate member 31 with the pressing force toward the external side in the axial direction.

In order to realize such drive for rotation, the motor side cam ring 54 controls the motor side spool 55 to perform the reciprocal movement in the diameter direction in accordance with the reciprocal movement of the motor plunger 33 caused by rotation of the motor cylinder 32 between the position (bottom dead center) where the motor plunger 33 is pushed in the maximum to the external side and the position (top dead center) where the motor plunger 33 is pushed in the maximum to the internal side. As described above, when the motor cylinder 32 is driven to rotate, the motor plunger 33 is pushed to move toward the internal side when it is moving, in accordance with the rotation of such motor cylinder 32, up to the top dead center from the bottom dead center along the motor swash plate member 31, and the working fluid in the motor oil chamber 33a is supplied to the internal path 56 from the motor aperture 32b passing the motor side communicating path 51d. The working fluid supplied to the internal path 56 is charged, as described above, into the pump oil chamber 23a passing the pump side communicating path 51c and pump aperture 22b.

As can be understood from above description, when the pump casing 20 is driven to rotate by receiving the rotating drive force of the engine E, the working fluid is discharged to the external path 57 from the hydraulic pump P and this working fluid is supplied to the hydraulic motor M to drive and rotate the motor cylinder 32. The working fluid which has driven the motor cylinder 32 to rotate is then supplied to the internal path 56 and is also charged to the hydraulic pump P from the internal path 56. As described above, a hydraulic pressure closing circuit connects the hydraulic pump P, hydraulic motor M and the distribution valve 50, the working fluid discharged from the hydraulic pump P in accordance with rotation of the hydraulic pump P is supplied to the hydraulic motor M to drive and rotates the same via the hydraulic pressure closing circuit, and moreover the working fluid discharged after driving the hydraulic motor M is then returned to the hydraulic pump P via the hydraulic pressure closing circuit.

In this case, under the condition that the motorcycle is running by driving the hydraulic pump P with the engine E and transmitting the rotating drive force of the hydraulic motor M to the wheels, the external path 57 becomes a high pressure side oil path, while the internal side path 56 becomes a low pressure side oil path. On the other hand, when the engine brake is generated because the driving force of wheels is transmitted to the hydraulic motor M and the rotating drive force of the hydraulic pump P is transmitted to the engine E as in the case where the motorcycle is running on a descending road, the internal path 56 becomes a high pressure oil path, while the external path 57 becomes a low pressure side oil path.

In this case, since the pump cylinder 22 and motor cylinder 32 are coupled to the transmission output shaft 6 and are rotated integrally, when the motor cylinder 32 is driven to rotate, the pump cylinder 22 is also rotated integrally and the relative rotating speed of the pump casing 20 and pump cylinder 22 becomes small. Therefore, relationship between the rotating speed Ni of the pump casing 20 and the rotating speed No of the transmission output shaft 6 (namely, the rotating speed of the pump cylinder 22 and motor cylinder 32) is expressed by the following formula (1) for the pump capacity Vp and motor capacity Vm.

$$Vp \cdot (Ni - No) = Vm \cdot No \tag{1}$$

The motor capacity Vm may be varied continuously by controlling the swing of the motor swing member 35 with the motor servo mechanism SV. Namely, when the rotating speed Ni of the pump swash plate member 21 is constant in the above formula (1), rotation of the transmission output shaft 6 may be varied continuously by conducting the control for the continuous change of the motor capacity Vm. However, shift control maybe realized by changing the motor capacity Vm by swinging the motor swing member 35 with the motor servo mechanism SV.

When the swing angle of the motor swing member 35 is controlled to a small angle, the motor capacity Vm becomes small. When the pump capacity Vp is assumed as constant and the rotating speed Ni of the pump swash plate member 21 is also assumed as constant in above relationship (1), the control is performed to increase the rotating speed of the transmission output shaft 6 to approximate the rotating speed Ni of the pump swash plate member 21. In other words, the continuous shift control to the top shifting stage is executed. When the motor swashplate angle becomes zero, namely, the swash plate is erected straight, the theoretical shift ratio (top shift ratio) of Ni=No can be obtained, resulting in a hydraulic lock state. Accordingly, the pump casing 20 integrally rotates together with the pump cylinder 22, motor cylinder 22 and transmission output shaft 6 in order to realize mechanical power transmission.

The control for continuous change of the motor capacity is conducted by variably controlling the motor swash plate angle through the swinging of the motor swing member 35.

Figure 10:
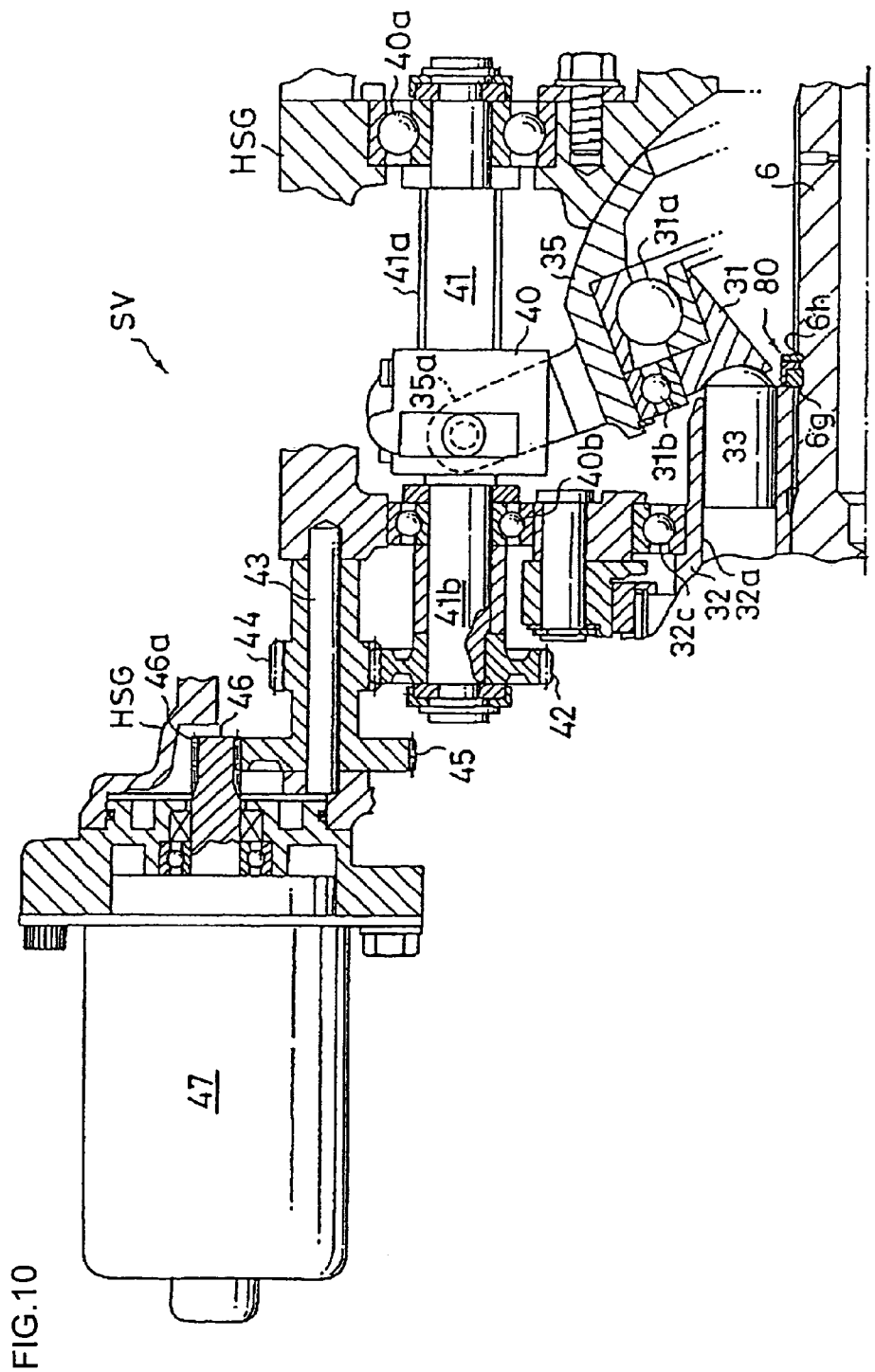
FIG. 10 is a cross-sectional view illustrating a motor servo mechanism in the static hydraulic continuously variable transmission of FIG. 1.

Here, the motor servo mechanism SV for swinging the motor swing member 35 will be described below mainly with reference to FIG. 10.

The motor servo mechanism SV is located at the area near the arm 35a of the motor swing member 35 and is extended in parallel to the transmission output shaft 6. Moreover, this motor servo mechanism SV includes a ball screw shaft 41 supported to freely rotate with the bearings 40a, 40b for the transmission housing HSG and a ball nut 40 allocated through the threading to a male screw 41a formed at the external circumference of the ball screw shaft 41. At the internal circumference of the ball nut 40, the ball female thread is formed with many balls held in the arrangement of screw with a cage and this ball female thread is screwed to the male screw 41a. The ball nut 40 is coupled with the arm 35a of the motor swing member 35. When the ball screw shaft 41 is driven to rotate, the ball nut 40 moves to the right and left on the ball screw shaft 41 to swing the motor swing member 35.

As described above, in order to drive and rotate the ball screw shaft 41, a swash plate control motor (electric motor) 47 is mounted to the external side surface of the transmission housing HSG. An idle shaft 43 is provided extending in parallel to a drive shaft 46 of the swash plate control motor 47 and an idle gear member including gears 44, 45 are mounted to freely rotate on the idle shaft 43. At the end part of the drive shaft 46 of the swash plate control motor 47, a gear 46a is formed and this gear 46a is engaged with the gear 45. Meanwhile, a gear 42 is coupled and mounted to the shaft 41b which is formed because the left side end of the ball screw shaft 41 is protruded to the left side and this gear 42 is engaged with the gear 44.

Accordingly, when the drive shaft 46 is rotated by conducting the rotating drive control of a swash plate control motor 47, this rotation is transmitted to the gear 45 and is then transmitted to the gear 42 from the gear 44 which is rotating integrally with the gear 45 to drive and rotate the ball screw shaft 41. In accordance with rotation of the ball screw shaft 41, the ball nut 40 moves this shaft 41 to the right and left directions to swing the motor swing member 35. As described above, since rotation of the swash plate control motor 47 is transmitted to the ball screw shaft 41 via the gears 46a, 45, 44, and 42, the transmission ratio can be changed and set freely by adequately setting gear ratios of these gears.

The swash plate control motor 47, as illustrated in FIG. 2, is exposed to the external side at the area near the rear side of the root portion of the rear side cylinder 1 in the V-type cylinder engine E. The cylinder 1 is integrated to the transmission housing HSG and the swash plate control motor 47 is positioned within the space between the rear side cylinder 1 and the transmission housing HSG. As described above, since the swash plate control motor 47 is positioned in the space surrounded by the rear side cylinder 1 and transmission housing HSG, this space can be used effectively. Since the swash plate control motor 47 is provided at the position separated from the coupling axle 130a of the swing arm 130 illustrated in FIG. 2, the shape of the swing arm is never restricted for avoiding interference with the swing arm 130. Moreover, the swash plate control motor 47 can be protected from the splash water from the lower side of body, rain water and dust from the front side while the motorcycle is running. Furthermore, the swash plate control motor 47 is allocated with a certain offset toward the left side from the center CL of the right and left directions of the body as illustrated in FIG. 10. Accordingly, the swash plate control motor 47 can be cooled effectively since the air flow generated from the front side while the motorcycle is running is effectively applied to the swash plate control motor 47.

In the static continuously variable transmission CVT configured as described above, a high pressure oil is no longer generated when the internal path 56 is coupled with the external path 57 and thereby power transmission can be shut down between the hydraulic pump P and hydraulic motor M. In other words, clutch control may be realized by controlling a communicating angle between the internal path 56 and the external path 57. The clutch apparatus CL for conducting such clutch control is also provided in the static hydraulic continuously variable transmission CVT and this clutch apparatus CL will then be described below with reference to FIGS. 11–14.

The clutch apparatus CL includes a rotating body 60 which is coupled to the end portion of the pump casing 20, weights 61 (ball or roller) respectively received within a plurality of receiving grooves 60a formed extending diagonally in the diameter direction at the internal surface of the rotating body 60, a disk type receiving body 62 including the arm 62a opposing to the receiving grooves 60a, a spring 63 for energizing the pressure receiving body 62 to control the arm 62a to press the weights 61 into the receiving grooves 60a, and a valve spool 70 engaged with an engaging portion 62c in one end side of the receiving body 62.

Figure 11:
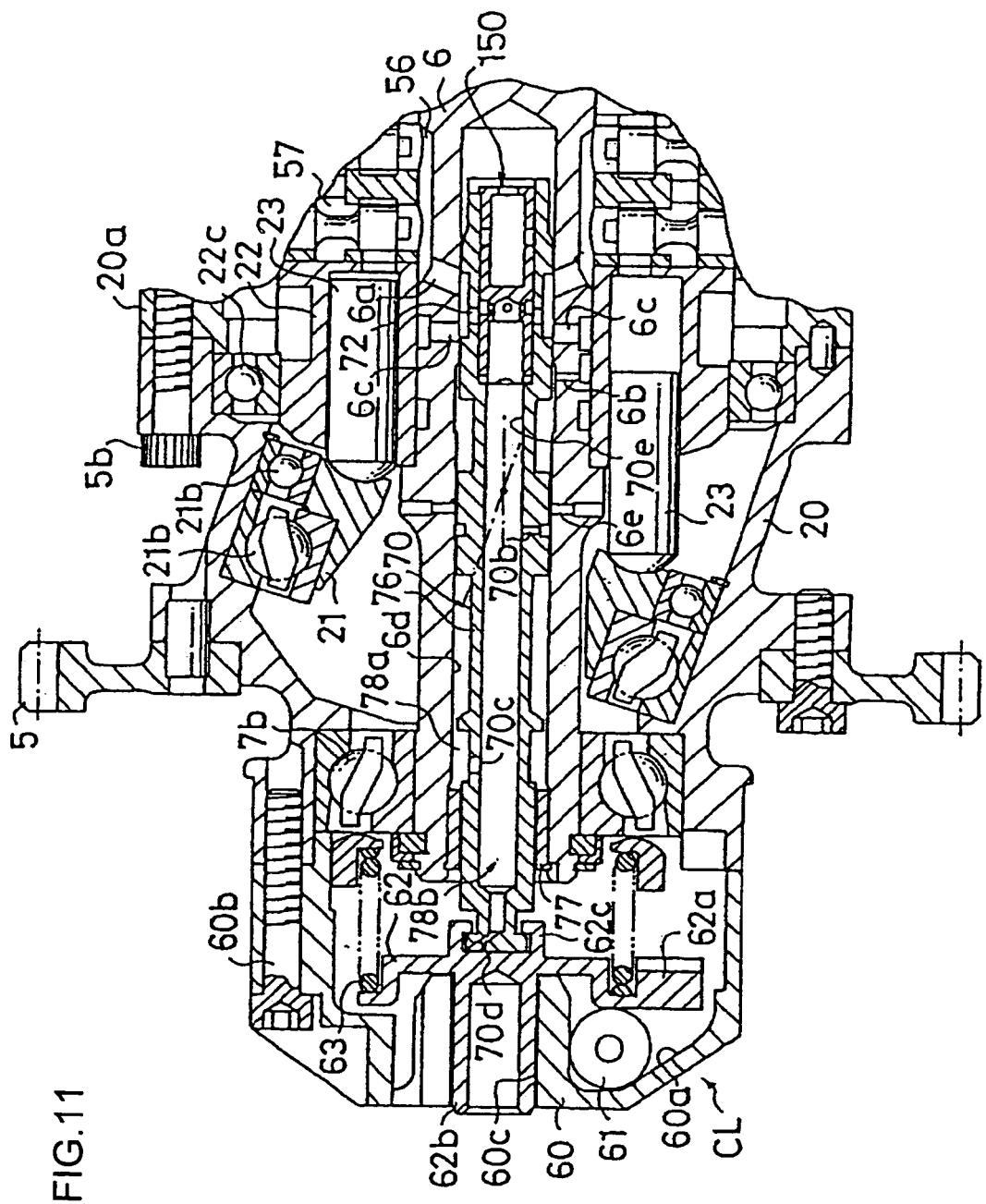
FIG. 11 is a cross-sectional view illustrating structures of a hydraulic pump and a clutch device in the static hydraulic continuously variable transmission of FIG. 1.

The rotating body 60 is provided with a through hole 60c around the rotating center shaft, a cylindrical portion 62b of the pressure receiving body 62 is inserted into this through hole 60c and thereby the pressure receiving body 62 can be moved in the axial direction. Therefore, the arm 62a pushes the weights 61 into the receiving grooves 60a with the energizing force given by the spring 63 to the pressure receiving body 62 under the condition that the pump casing 20 is in the stationary condition and the rotating body 60 is not rotating. In this case, since the receiving grooves 60a are formed extending diagonally as illustrated in the figure, the weights 61 are pushed into the internal side in the diameter direction and the pressure receiving body 62 is moved to the left as illustrated in FIG. 1 and FIG. 11.

When the rotating body 60 rotates because the pump casing 20 is driven to rotate from this condition, a weight 61 is pushed, with the centrifugal force, toward the diameter direction in the pressure receiving groove 60a. As described above, when the weight 61 is pushed toward the external diameter direction with the centrifugal force, the weight 61 moves obliquely to the right direction along the pressure receiving groove 60a to push the arm 62a to the right direction and the pressure receiving body 62 is moved to the right opposing to activation of the spring 63. The amount of movement to the right of the pressure receiving body 62 changes, in accordance with the centrifugal force working on weight 61, namely the rotating speed of the pump casing 20 and the pressure receiving body 62 is moved to the right up to the position indicated in FIG. 4 when the rotating speed is higher than the predetermined rotating speed. The valve spool 70 engaged with the engaging portion 62c of the pressure receiving body 62 moving to the right and left sides in the axial direction as described above is provided through engagement with the spool hole 6d opened at the end portion of the transmission output shaft 6 and extended in the axial direction and is moved to the right and left sides of the axial direction with the pressure receiving body 62.

As is understood from above description, a governor mechanism is formed of the rotating body 60, weight 61, and pressure receiving body 62 to generate a governor force in the axial direction corresponding to the input rotating speed of the hydraulic pump P, using the centrifugal force working on the weight 61 with rotation of the pump casing 20.

Meanwhile, an internal branching oil path 6a, which branches from the internal path 56, is coupled to the spool hole 6d and external branching oil paths 6b, 6c coupled with the spool hole 6d from the communicating path 57a branching from the external path 57 are formed as shown in detail in FIGS. 5 and 6 and FIGS. 11–14. FIG. 5 and FIG. 12 correspond to FIG. 1 and indicate the condition that the pressure receiving body 62 is moved to the left side to move the valve spool 70 to the left side. In this condition, the internal branching oil path 6a and the external branching oil path 6c are communicated via a right groove portion 72 of the valve spool 70 and the internal path 56 and the external path 57 are also communicated. On the other hand, FIG. 6 and FIG. 14 correspond to FIG. 4 and indicate the condition that the pressure receiving body 62 is moved to the right side to move the valve spool 70 to the right side. In this condition, the internal branching oil path 6a is shut from the external branching oil path 6c with a center land portion 73 of the valve spool 70. Moreover, the internal path 56 is also shut from external path 57. FIG. 13 illustrates the condition that the valve spool 70 is located at the central position.

As described above, since the valve spool 70 is moved to the left when the pump casing 20 is in the stationary condition, the internal branching oil path 6a communicates with the external branching oil path 6c and the power transmission between the hydraulic pump P and hydraulic motor M is shut down, resulting in a clutch opening condition. When the pump casing 20 is driven to rotate from such condition, the pressure receiving body 62 is gradually moved to the right with the centrifugal force working on the weight 61 in accordance with the rotating speed and thereby the valve spool 70 is also moved to the right together. As a result, the internal branching oil path 6a is gradually shut down from the external branching oil path 6c with the central land portion 73 of the valve spool 70.

In the static hydraulic continuous variable transmission CVT of this embodiment, when the pump casing 20 is driven to rotate with the engine E, the valve spool 70 is moved to the left resulting in the clutch opening condition under the condition that the rotating speed of engine is low (idling condition), but the clutch is gradually coupled when the number of rotation of engine increases.

Here, the external diameter d1 of the central land portion 73 and the external diameter d2 of the left land portion 74 in the valve spool 70 are set in the relation of d1<d2. Therefore, when the valve spool 70 is moved to the left resulting in the clutch connecting condition, hydraulic pressure in the external path 57 working in the left groove portion 75 of the valve spool 70 works to move the valve spool 70 to the left side. The pushing force in the left side corresponds to the hydraulic pressure working on the left groove portion 75 and difference in pressure receiving area due to the difference between external diameters d1 and d2. This difference in the pressure receiving area is constant but hydraulic pressure working on the left groove portion 75 is the hydraulic pressure within the external path 57 and it changes in accordance with the drive force. Namely, as the drive force is larger, the hydraulic pressure becomes higher. This structure corresponds to a hydraulic force giving means.

As can be understood from above description, clutch engagement control due to movement of the valve spool 70 is performed in accordance with balance (Fgov=Fp+Fspg) of a governor force (Fgov) generated by a centrifugal force working on the weight 61 according to the rotating speed of the pump casing 20, an activating force (Fspg) of a spring 63, and a pushing force (Fp) by the hydraulic pressure working on the left groove portion 75 of the valve spool 70. Specifically, the control for clutch engagement is conducted in accordance with rise of the rotating speed of the pump casing 20 and control is also performed to give the force in the direction to disengagement of clutch in accordance with the rise of hydraulic pressure of the external path 57 (in accordance with enlargement of the transmission drive force to the hydraulic motor M from the hydraulic pump P).

The condition of the intermediate stage for controlling of the partial clutch engagement condition is illustrated in FIG. 13. Under this condition, the right end portion 73a of the central land portion 73 of the valve spool 70 is communicated a little with the external branching oil path 6b, resulting in the condition that the internal path 56 is partially communicated with the external path 57, namely the partial clutch engagement condition. In this partial clutch engagement condition, the internal path 56 and the external path 57 are communicated and shut off with a little movement in the axial direction of the valve spool 70. However, since the movement in the axial direction of the valve spool 70 is balanced with the governor force (Fgov), activating force and pushing force by hydraulic pressure, if the pushing force is rapidly raised with the hydraulic pressure with the sudden throttle operation, the valve spool 70 works in the clutch disengagement side. Thereby, the internal path 56 and external path 57 repeat the communicating conditions, making stable transmission of the power difficult.

Therefore, a buffer mechanism is provided to stabilize the clutch performance without movement of the valve spool 70 in accordance with highly sensitive reaction. This buffer mechanism will be described with reference to FIG. 4 and FIG. 11, in addition to FIG. 1 and FIG. 4. As illustrated in FIG. 11, a variable oil chamber forming groove 76 is provided in the left side of the left land portion 74 in the valve spool 70, and a guideline portion 71 which is smaller than the left land portion 74 is provided in the left side of the variable oil chamber forming groove 76. The guideline portion 71 is engaged with a guide member 77 allocated in the left end portion of a spool hole 6d and a variable oil chamber 78a, surrounded by the spool hole 6d, guide member 77 and left land portion 74, is formed to the external circumference of the variable oil chamber forming groove 76.

In addition, an oil reservoir forming hole 70e is also formed extending in the axial direction of the valve spool 70, an opening modulator valve 150 is also provided at the right end portion of the oil reservoir forming hole 70e, and the left end portion is closed to form an orifice hole 70d. As a result, the oil reservoir forming hole 70e is closed with the modulator valve 150 to form an oil reservoir oil chamber 78b. To the valve spool 70, a communicating hole 70c is formed to communicate the variable oil chamber forming groove 76 and oil reservoir forming hole 70e. The variable oil chamber 78a and the oil reservoir oil chamber 78b are coupled each other via the communicating hole 70c.

The buffer mechanism is formed of the variable oil chamber 78a and oil reservoir oil chamber 78b coupled via the communicating hole 70c. Operations of this buffer mechanism will be described below. When the valve spool 70 is moved to the left side in the axial direction, since the guide member 77 is fixed and held in the spool hole 6d, the volume of the variable oil chamber 78a becomes small and the working fluid in the oil chamber is compressed with the left land portion 74. At this time, since the oil reservoir oil chamber 78b cannot vary the volume thereof, movement of the valve spool 70 is controlled to become gradual because such compression force works as resistance. Meanwhile, when the valve spool 70 is moved to the right in the axial direction, volume of the variable oil chamber 78a becomes large, but a resistance force to the force in the direction to make large the volume works when the diameter of the communicating hole 70c is adjusted (reduced). Accordingly, the movement of valve spool 70 is controlled to become gradual.

The left end portion of the oil reservoir hole 70e is closed and is provided with the orifice hole 70d, and the oil flows through this orifice hole 70d. Therefore, a resistance value may be adjusted with this orifice hole 70d. This orifice hole 70d is opening at the engagement coupling portion between the engaging portion 62c of the pressure receiving body 62 and the left end portion of the valve spool 70 and the engagement coupling portion is lubricated with the oil discharged through the orifice hole 70d.

In the buffer mechanism configured as described above, a modulator valve 150 is provided to fill the variable oil chamber 78a and oil reservoir oil chamber 78b with the working fluid. This modulator valve 150 will then be described with reference to FIGS. 12–FIG. 14. A communicating hole 70a is formed to the right groove portion 72 of the valve spool 70 for communication with the modulator valve 150 and the working fluid in the right groove portion 72 flows into the modulator valve 150 through the communicating hole 70a. The modulator valve 150 is formed of a pressure reducing valve to supply the working fluid in the right groove portion 72 to the oil reservoir oil chamber 78b to hold the hydraulic pressure in the oil reservoir oil chamber 78b to the predetermined pressure set by the modulator valve 150. Therefore, the variable oil chamber 78a and the oil reservoir oil chamber 78b are always filled with the working fluid of the predetermined pressure set by the modulator valve 150.

Here, since the oil in the oil reservoir oil chamber 78b is always discharged passing through the orifice hole 70d, the amount of oil discharged is supplemented via the modulator valve 150. The supplementary oil has been reserved in the right groove portion 72 communicating with the low pressure side oil path 56 and high pressure side oil path 57 through the engagement condition of clutch. Therefore, this oil is used as the working fluid in the low pressure side oil path 56 and high pressure side oil path 57. Namely, the working oil in the hydraulic pressure closing circuit is used as the supplementary oil. Accordingly, the working fluid in the hydraulic pressure closing circuit is always discharged and replaced with as much of the new working fluid as the amount of the supplementary oil (this working fluid replacing system will be described below), in order to prevent temperature rise of the working fluid in the closing circuit.

Moreover, a discharge hole 70b is formed through the valve spool 70 up to the external surface of the left land portion 74 from the oil reservoir oil chamber 78b (oil reservoir oil chamber forming hole 70e) and a discharge hole 6e is formed to the transmission output shaft 6 up to the external side from the spool hole 6d. As illustrated in FIG. 13, when the valve spool 70 is located at the partial clutch engagement position, both discharge holes 70b, 6e are communicated with each other via the external circumference groove 70f of the valve spool 70. As a result, in this partial clutch engagement condition, the working fluid in the oil reservoir oil chamber 78b is discharged to the external side via both discharge holes 70b, 6e.

As described above, in the partial clutch engagement condition, the internal path 56 and external path 57 partially communicate with each other. Since the working fluid flows into the low pressure side oil path from the high pressure side oil path within the hydraulic pressure closing circuit passing the communicating portion, the working fluid in the hydraulic pressure closing circuit can become high in temperature. However, when the working fluid in the oil reservoir oil chamber 78b is discharged to the external side via both discharge holes 70b, 6e under such partial clutch engagement condition, the amount of working fluid discharged is supplemented via the modulator valve 150. This supplementary oil has been reserved within the right groove portion 72 and the right groove portion 72 is communicated with the low pressure side oil path 56 and high pressure side oil path 57 in accordance with the engagement condition of clutch. Therefore, the working fluid in the low pressure side oil path 56 and high pressure side oil path 57, namely, the working fluid in the hydraulic pressure closing circuit, is used as the supplementary oil. Accordingly, as much of the working fluid in the hydraulic pressure closing circuit as the amount of supplementary oil is always discharged and replaced with the new oil (this working fluid replacing system will be described later). As a result, the closing circuit may effectively reduce temperature rise, particularly under the partial clutch engagement condition.

The static hydraulic continuously variable transmission CVT configured as described above is provided with a lockup mechanism 90 which closes the hydraulic pressure closing circuit to result in the lockup condition when the transmission ratio becomes 1.0, namely when the input number of rotations of the hydraulic pump P becomes equal to the output number of rotations of the hydraulic motor M. This lockup mechanism 90 will be described with reference to FIGS. 15–17. The lockup mechanism 90 includes, as described above, a motor offset member 91 which is allocated to slide on the end portion of the motor casing 30b. The motor offset member 91 is formed like a ring in the entire part and includes a motor side cam ring 54 within the internal circumference surface 91a. At the upper end of the motor offset member 91, an engaging portion 91a is formed. This engaging portion 91a is pivotally coupled with the motor casing 30b with an engagement pin 92 and the motor offset member 91 can swing for the motor casing 30b around the engagement pin 92.

A lockup actuator LA is mounted to the motor casing 30b at the lower side of the motor offset member 91 for the swinging operation thereof. This lockup actuator LA is formed of a cylinder 96 fixed to the motor casing 30b, a piston 94 allocated to freely slide within the cylinder hole of the cylinder 96, a cover member 95 mounted to the cylinder 96 closing the cylinder hole, and a spring 97 for activating the piston 94 toward the cover member 95. The inside of the cylinder hole is divided into two sections with the piston 94 to form a lockup working fluid chamber 96a and a lockup releasing chamber 96b. The spring 97 is positioned within the lockup releasing chamber 96b. The end portion of piston 94 is extended to the external side from the cylinder 96 and an extruding portion 94a thereof is pivotally coupled with a coupling portion 91b formed at the lower part of the motor offset member 91 via the coupling pin 93.

Figure 16:
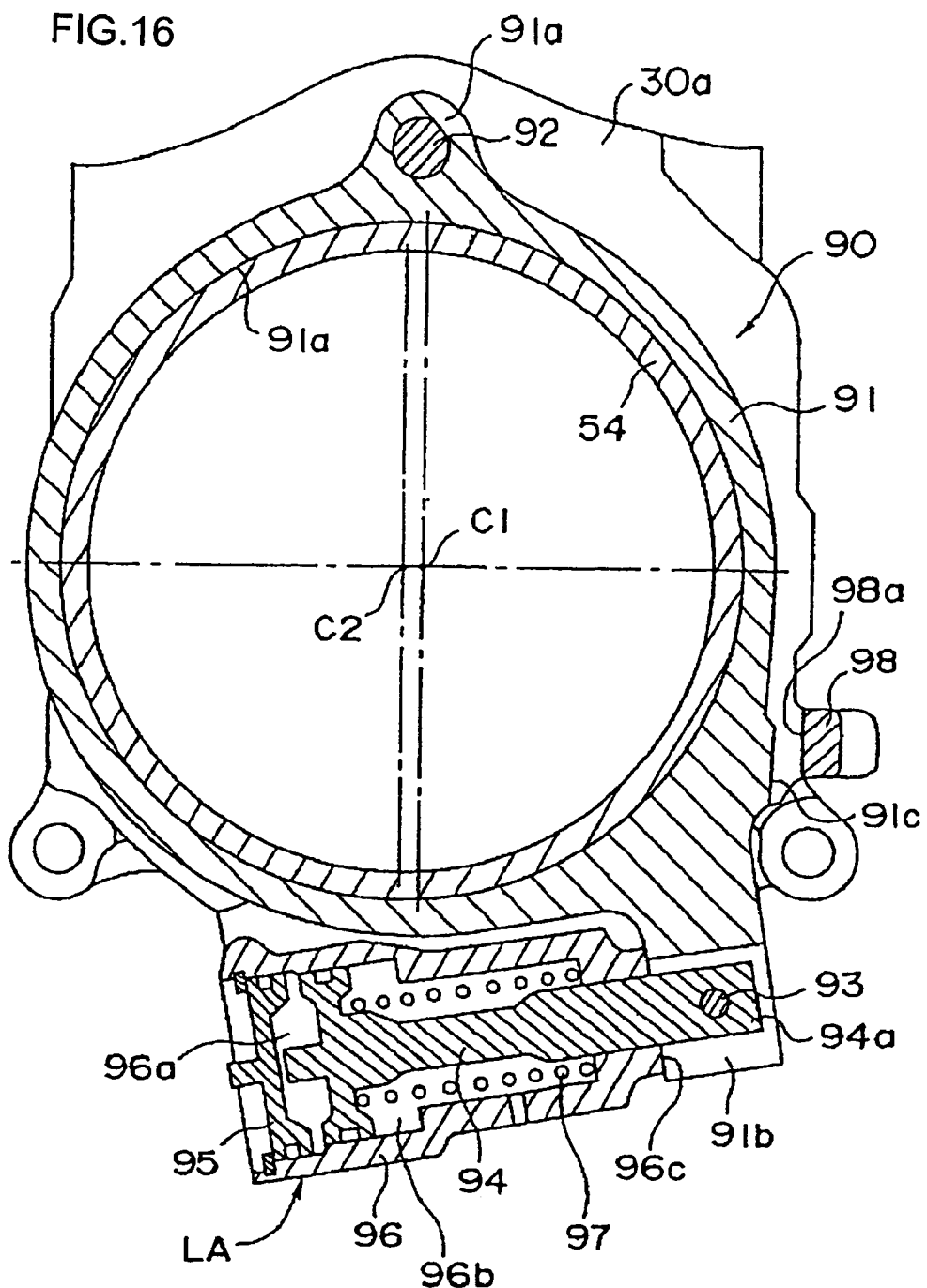
FIG. 16 is a cross-sectional view illustrating a structure cut along line Y—Y of FIG. 15 with the lockup mechanism located at the normal position.
Figure 17:
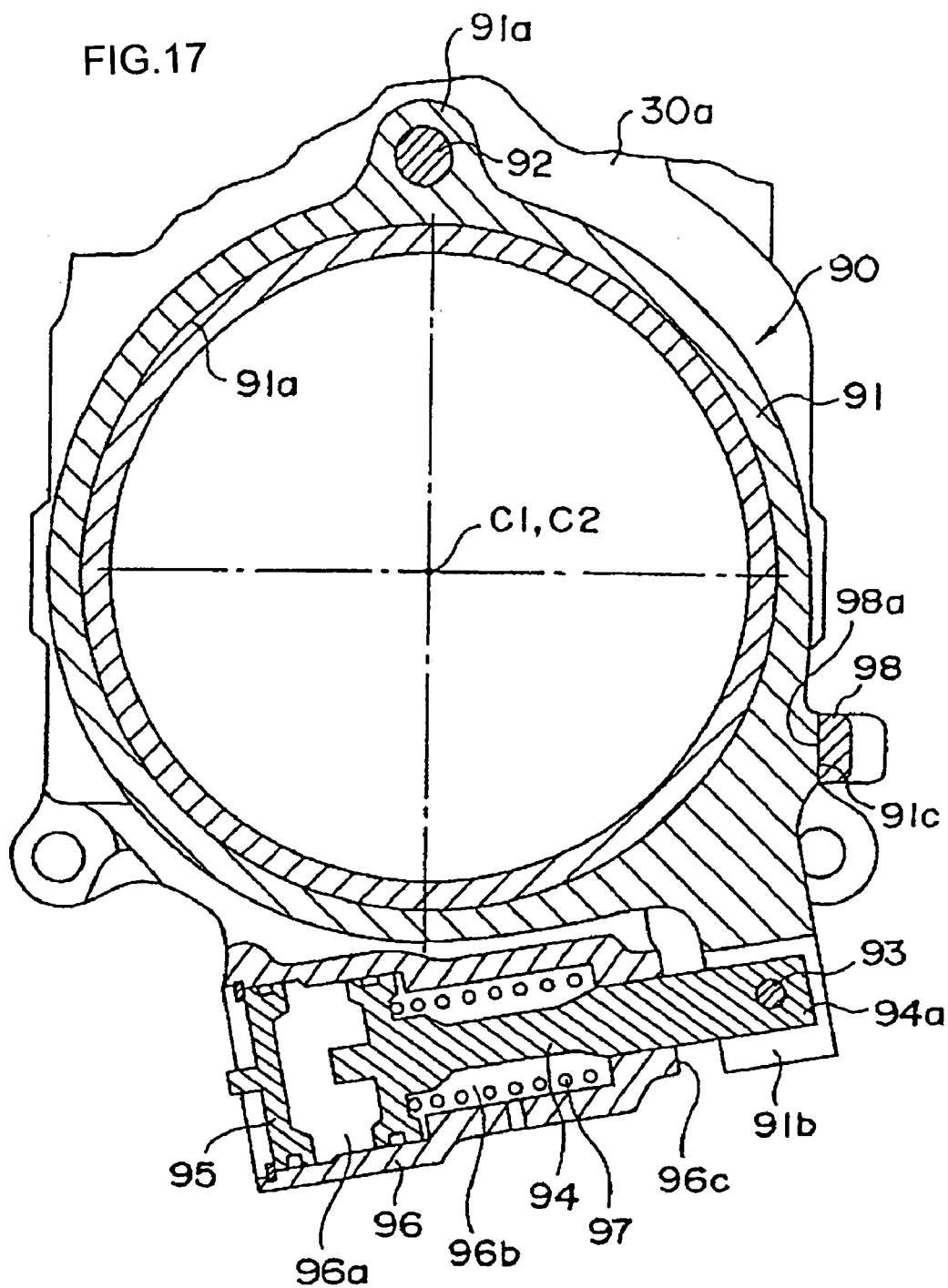
FIG. 17 is a cross-sectional view illustrating the structure cut along the line Y—Y of FIG. 15 with the lockup mechanism located at the lockup position.

In the lockup mechanism 90 configured as described above, when the hydraulic pressure in the lockup working fluid chamber 96a is freed, the piston 94 is moved to the side of the cover member 95 with an activating force of the spring 97 positioned in the lockup releasing chamber 96b. At this time, as illustrated in FIG. 16, the coupling portion 91b is in contact with the external end surface 96c of the cylinder 96. Under this condition, the center C2 of the internal circumference surface 91a of the motor offset member 91 is located with a certain offset for the transmission output shaft 6 and the center C1 of the output rotating body (motor cylinder 32) and the motor offset member 91 is located at the normal position.

On the other hand, when the lockup working fluid pressure is supplied to the lockup working fluid chamber 96a, the piston 94 is moved to the right, with this hydraulic pressure, in the figure against the activation of the spring 97. Thereby, the extended portion 94a is further extended. Accordingly, the motor offset member 91 is swung counterclockwise around the engagement pin 95 and the contact surface 91c formed at the side portion of the motor offset member 91 is in contact with the contact surface 98a of the positioning projection 98 integrally formed with the motor casing 30a. Under this condition, the center C2 of the internal circumference surface 91a of the motor offset member 91 overlaps with the transmission output shaft 6 and the center C1 of the output rotating body (motor cylinder 32) and thereby the motor offset member 91 is located at the lockup position.

Here, when the motor offset member 91 is located at the lockup position as described above, the center of the motor side cam ring 54 positioned within the internal circumference surface 91a is matched with the center of rotation of the motor cylinder 32, the motor side spool 55 no longer performs the reciprocal movement even when the motor cylinder 32 rotates, and supply of higher hydraulic pressure oil to the motor plunger 33 is shut off. At this time, connection to the low hydraulic pressure oil path 56 is maintained. As a result, compression loss and leakage of working fluid in the motor plunger 33 can be reduced, mechanical power loss of the bearing or the like because the high pressure is not applied to the motor plunger 33 can also be lowered, and power transmission efficiency can be improved because a slide resistance of the pump side spool 53 is lowered.

Figure 18:
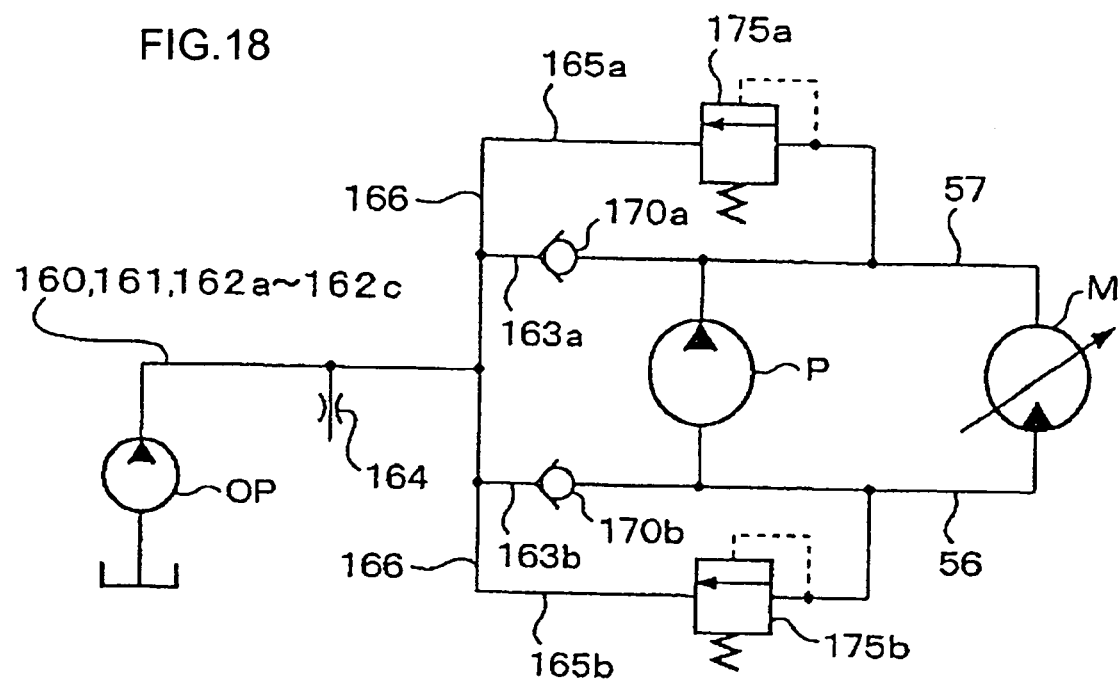
FIG. 18 is a hydraulic circuit diagram illustrating a structure of oil paths in the static hydraulic continuously variable transmission of FIG. 1.

Next, a structure of the supplementary system of the working fluid to the hydraulic pressure closing circuit will be described with reference to FIGS. 12–14 and FIG. 18. As illustrated in FIG. 18, supplement of the working fluid is performed by an oil pump OP (refer to FIG. 3) and therefore the oil discharged from the oil pump OP driven by the engine E is supplied to an oil path 160 formed extending in the axial direction within the transmission output shaft 6 via the oil path in the transmission housing HSG. The oil path 160 is coupled, at its end portion, with an oil path 161 extended in the diameter direction in the transmission output shaft 6 and is opened to the external circumference. The oil path 161 is further coupled with the oil paths 162a, 162b, 162c formed extending in the axial direction in the output rotating body (motor cylinder 32, valve body 51, and pump cylinder 22). An orifice 164 is formed at the end portion of the oil path 162c through communication with the external side and the inside of the transmission is lubricated with the working fluid flowing to the external side from the orifice 164.

Within the pump cylinder 22, a first check valve 170a for supplying the supplement oil to the external path 57 and a first relief valve 175a for relief of the working fluid when the hydraulic pressure in the external path 57 exceeds the predetermined high-pressure are provided as illustrated in FIGS. 12–14. In addition, although not illustrated in FIGS. 12–14, a second check valve 170b for supplying the supplement oil to the internal path 56 and a second relief valve 175b for relief of the working fluid when the hydraulic pressure in the external path 57 exceeds the predetermined high-pressure are also provided in the similar structure.

As illustrated, an oil path 163a is also formed within the pump cylinder 22 for connecting the oil path 162c and the check valve 170a. Therefore, the working fluid supplied from the oil pump OP is supplied as the supplement oil to the external path 57 via the first check valve 170a (in accordance with the leak from the hydraulic pressure closing circuit). The oil paths 162a, 162b, 162c are formed in the plural numbers, an oil path 163b is also formed in the pump cylinder 22 to connect the oil path 162c and the second check valve 170b, and the working fluid supplied from the oil pump OP is supplied as the supplement oil into the internal path 56 via the second check valve 170b (in accordance with the leak from the hydraulic pressure closing circuit).

On the other hand, the working fluid relieved from the first relief valve 175a exceeding the predetermined high pressure of the hydraulic pressure in the external path 57 with the activating means is then discharged into a return oil path 165a formed within the pump cylinder 22. This returning oil path 165a is formed like a ring to the external circumference surface of the transmission output shaft 6 and also communicates with a ring type oil path 166 which is engaged with and surrounded by the pump cylinder 22. This oil path 166 communicates with the oil path 162c via the oil path 163a. The working fluid relieved from the first relief valve 175a is discharged into the oil path for supplying supplement oil supplied from the oil pump OP. Although not illustrated, the working fluid relieved from the second relief valve 175b is also discharged from the returning oil path 165b passing the ring type oil path 166 and oil path 163b into the oil path 162c, namely, the oil path for supplying the supplement oil.

The working fluid relieved from the first and second relief valves 175a, 175b is discharged to the oil path 162c for supplying supplement oil passing the returning oil paths 165a, 165b. Moreover, since the relieved oil is not returned to the hydraulic pressure closing circuit, temperature rise of oil within the hydraulic pressure closing circuit can be suppressed. Moreover, since the hydraulic pressure in the oil path 162c for supplying the supplement oil is stabilized, the working fluid in the oil path of the higher hydraulic pressure can be relieved efficiently.

Moreover, since the oil path for supplying the supplement oil is extended in the output rotating body from the transmission output shaft 6, the first and second relief valves 175a, 175b and the returning oil paths 165a, 165b are allocated within the pump cylinder 22 (output rotating body), and the returning oil paths 165a, 165b are connected to the oil path for supplying the supplement oil 162c in the pump cylinder 22. Accordingly, a compact structure is created. For example, the returning oil paths 165a, 165b may be cut to a short length by including the high pressure relief structure within the pump cylinder 22. In addition, the returning oil paths 165a, 165b are connected to the oil path for supplying the supplement oil 162c (and 163a, 163b) via the ring type oil path 166 formed extending in the circumferential direction to the engaging portion with the pump cylinder 22 at the external circumference surface of the transmission output shaft 6. Therefore, this portion can be easily formed as the oil path connecting structure.

As described above, since the swash plate actuator can be positioned at the area adjacent the root of the cylinder casing in the main housing (within the space surrounded by the cylinder casing and the main housing located at the signal side bank, particularly when a V-type cylinder engine is used), the swash plate actuator can be protected with the cylinder casing and main housing. In addition, a compact power unit may be formed by effectively utilizing the dead space adjacent the root of the cylinder casing.

When a power unit made in accordance with the present invention is mounted to a motorcycle, the unit can be fitted at the rear side of the cylinder casing in which the swash plate actuator is fitted extending toward the upper side from the main housing and at the upper side of the main housing but not extending toward the rear side of the power unit. Accordingly, problems associated with interference for a swing arm coupled with the main frame at the rear part side of the power unit can be reduced. In addition, the main housing can protect the cylinder casing from splash water from the lower side of the body, rainwater, and dust coming from the front surface side. In this case, it can be desirable that the swash plate actuator is positioned with a certain bias in any of the right and left directions of the body for the center of the cylinder casing. Accordingly, the swash plate actuator can be cooled effectively because the airflow is facing the actuator from the front surface side during use.

The example embodiment of the continuously variable transmission made in accordance with the present invention is described above as part of a motorcycle. However, embodiments of the present invention are not limited to applications within a motorcycle, and may be employed to various power transmission mechanisms of vehicles such as, for example, four-wheeled vehicles such as automobiles and general-purpose mechanical machines.

What is claimed is:

1. A power unit for vehicle, comprising:
   an engine having a crank shaft mechanical unit aligned transverse to the vehicle;
   a static hydraulic continuously variable transmission including a rotary mechanical unit aligned parallel to the crank shaft mechanical unit;
   a main housing such that the crank shaft mechanical unit of the engine and the rotary mechanical unit of the static hydraulic continuously variable transmission are positioned in the main housing;
   a gear train engaged with said static hydraulic continuously variable transmission;
   a drive shaft aligned longitudinal to the vehicle;
   drive and driven bevel gears engaged with one another and said gear train and said drive shaft, respectively, to change direction of rotational energy from transverse to longitudinal;
   a cylinder casing including a piston mechanical unit of the engine, the cylinder casing being coupled to the main housing at a root of the cylinder casing; and
   a swash plate actuator providing swash plate angle control of at least one of a hydraulic pump and a hydraulic motor, the swash plate actuator being attached to the main housing and positioned adjacent to the root of the cylinder casing relative to the main housing,
   wherein the swash type hydraulic pump and the hydraulic motor are coupled by a hydraulic pressure closing circuit to extract an output rotation of the hydraulic motor by changing a speed of input rotation of the hydraulic pump through a rotating drive of the hydraulic pump with the engine and the swash plate angle control of at least one of the hydraulic pump and hydraulic motor.

2. The power unit of claim 1, wherein the engine is a V-type cylinder engine.

3. The power unit of claim 2, wherein the swash plate actuator is positioned within a space partially surrounded by the cylinder casing and the main housing.

4. The power unit of claim 2, wherein the cylinder casing extends upward from the main housing.

5. The power unit of claim 4, wherein the swash plate actuator is mounted at a rear side of the cylinder casing and located at an upper side of the main housing.

6. The power unit of claim 2, wherein the swash plate actuator is biased in a direction transverse with respect to a center of the cylinder casing.

7. The power unit of claim 1, wherein the swash plate actuator is positioned within a space partially surrounded by the cylinder casing and the main housing.

8. The power unit of claim 1, wherein the cylinder casing extends upward from the main housing.

9. The power unit of claim 8, wherein the swash plate actuator is mounted at a rear side of the cylinder casing and located at an upper side of the main housing.

10. The power unit of claim 1, wherein the swash plate actuator is biased in a direction transverse with respect to a center of the cylinder casing.

11. A motorcycle, comprising:
    a body;
    at least two wheels coupled to the body; and
    a power unit coupled to the body, the power unit including:
    an engine having a crank shaft mechanical unit aligned transverse to the vehicle;
    a static hydraulic continuously variable transmission including a rotary mechanical unit aligned parallel to the crank shaft mechanical unit;
    a main housing such that the crank shaft mechanical unit of the engine and the rotary mechanical unit of the static hydraulic continuously variable transmission are positioned in the main housing;
    a gear train engaged with said static hydraulic continuously variable transmission;
    a drive shaft aligned longitudinal to the vehicle;
    drive and driven bevel gears engaged with one another and said gear train and said drive shaft, respectively, to change direction of rotational energy from transverse to longitudinal;
    a cylinder casing including a piston mechanical unit of the engine, the cylinder casing being coupled to the main housing at a root of the cylinder casing; and
    a swash plate actuator providing swash plate angle control of at least one of a hydraulic pump and a hydraulic motor, the swash plate actuator being attached to the main housing and positioned adjacent to the root of the cylinder casing relative to the main housing,
    wherein the swash type hydraulic pump and the hydraulic motor are coupled by a hydraulic pressure closing circuit to extract an output rotation of the hydraulic motor by changing a speed of input rotation of the hydraulic pump through a rotating drive of the hydraulic pump with the engine and the swash plate angle control of at least one of the hydraulic pump and hydraulic motor.

12. The motorcycle of claim 11, wherein the engine is a V-type cylinder engine.

13. The motorcycle of claim 12, wherein the swash plate actuator is positioned within a space partially surrounded by the cylinder casing and the main housing.

* * * * *